United States Patent
Amano et al.

(10) Patent No.: US 10,098,080 B2
(45) Date of Patent: Oct. 9, 2018

(54) DEVICE, METHOD AND COMPUTER READABLE MEDIUM

(71) Applicant: SONY CORPORATION, Tokyo (JP)

(72) Inventors: Sho Amano, Kanagawa (JP); Tomoya Yamaura, Tokyo (JP); Yasushi Katayama, Tokyo (JP); Hideyuki Suzuki, Tokyo (JP); Yoshihiko Ikenaga, Tokyo (JP); Kimiya Kato, Tokyo (JP)

(73) Assignee: SONY CORPORATION, Tokyo (JP)

( * ) Notice: Subject to any disclaimer, the term of this patent is extended or adjusted under 35 U.S.C. 154(b) by 150 days.

(21) Appl. No.: 14/647,411

(22) PCT Filed: Sep. 6, 2013

(86) PCT No.: PCT/JP2013/005309
§ 371 (c)(1),
(2) Date: May 26, 2015

(87) PCT Pub. No.: WO2014/091643
PCT Pub. Date: Jun. 19, 2014

(65) Prior Publication Data
US 2015/0327192 A1    Nov. 12, 2015

(30) Foreign Application Priority Data

Dec. 14, 2012 (JP) ................. 2012-272940

(51) Int. Cl.
*H04W 4/00* (2018.01)
*H04W 56/00* (2009.01)
(Continued)

(52) U.S. Cl.
CPC ........ *H04W 56/001* (2013.01); *H04B 17/364* (2015.01); *H04L 7/0041* (2013.01);
(Continued)

(58) Field of Classification Search
None
See application file for complete search history.

(56) References Cited

U.S. PATENT DOCUMENTS

2005/0208979 A1    9/2005    Kim
2008/0056154 A1    3/2008    Firestone et al.
(Continued)

FOREIGN PATENT DOCUMENTS

JP    2002204278 A    7/2002
JP    2006128997 A    5/2006
(Continued)

OTHER PUBLICATIONS

Peter Van Beek et al., "Delay-Constrained Rate Adaptation for Robust Video Transmission Over Home Networks", Sep. 11-14, 2005, pp. 4, ISBN 0-7803-9134-9, IEEE.
(Continued)

*Primary Examiner* — Zewdu A Beyen
(74) *Attorney, Agent, or Firm* — Chip Law Group

(57) ABSTRACT

A first device for processing data, the first device including at least one control circuit configured to adjust at least one parameter related to a delay time based on a measured value of the delay time. The measured value of the delay time is a difference between a first time associated with when the first device processes the data and a second time associated with when a second device processes the data.

17 Claims, 13 Drawing Sheets

(51) Int. Cl.
    *H04L 7/00*     (2006.01)
    *H04N 21/4223*     (2011.01)
    *H04N 21/442*     (2011.01)
    *H04N 21/4363*     (2011.01)
    *H04N 21/6379*     (2011.01)
    *H04B 17/364*     (2015.01)
    *H04L 12/26*     (2006.01)

(52) U.S. Cl.
    CPC ..... *H04L 43/0852* (2013.01); *H04N 21/4223* (2013.01); *H04N 21/43637* (2013.01); *H04N 21/44209* (2013.01); *H04N 21/44227* (2013.01); *H04N 21/6379* (2013.01); *H04W 56/00* (2013.01)

(56) References Cited

U.S. PATENT DOCUMENTS

2011/0013085 A1     1/2011     Kulyk
2011/0249073 A1*   10/2011   Cranfill ................. H04N 7/147
                                                       348/14.02
2011/0299588 A1   12/2011   Zhou et al.
2012/0257671 A1   10/2012   Brockmann et al.
2012/0287289 A1   11/2012   Steinberg et al.
2014/0118469 A1*   5/2014   Gwilt ................. H04M 7/0027
                                                       348/14.08

FOREIGN PATENT DOCUMENTS

JP     2008-278388 A     11/2008
JP     2012-141685 A     7/2012

OTHER PUBLICATIONS

Office Action Received for Japanese Patent Application No. 2012-272940 dated Dec. 1, 2015.

Okazaki et al., An End-to-end Delay Evaluation of Visual Communication on the Internet, Proceedings of the 2003 Society Conference of Institute of Electronics, Information and Communication Engineers (2), Japan, Institute of Electronics, Information and Communication Engineers, Sep. 10, 2003, p. 454.

* cited by examiner

FIG. 3A

| IMAGE INFORMATION (FRAME UNIT) | TIME INFORMATION (msec) (ELAPSED TIME FROM REFERENCE TIME) |
|---|---|
| 1 | 0 |
| 2 | 33 |
| 3 | 66 |
| 4 | 100 |
| ⋮ | ⋮ |

FIG. 3B

| SOUND INFORMATION (SAMPLE UNIT) | TIME INFORMATION (msec) (ELAPSED TIME FROM REFERENCE TIME) |
|---|---|
| 1 | 0.023 |
| 2 | 0.045 |
| 3 | 0.068 |
| ⋮ | ⋮ |

DEVICE, METHOD AND COMPUTER READABLE MEDIUM

TECHNICAL FIELD

The present technology relates to an information processing apparatus. More specifically, the present technology relates to an information processing apparatus which exchanges various kinds of information by using wireless communication and a control method thereof.

BACKGROUND ART

In the related art, a wireless communication technology for exchanging various kinds of data by using wireless communication is present. For example, an information exchanging apparatus for exchanging various kinds of data between two wireless communication apparatuses through wireless communication has been proposed (see Patent Literature 1, for example).

CITATION LIST

Patent Literature

PTL 1: JP 2008-278388A

SUMMARY

Technical Problem

According to the aforementioned technology in the related art, it is possible to exchange various kinds of data between two wireless communication apparatuses through wireless communication without necessity of wired connection. However, if various kinds of data are exchanged between two wireless communication apparatuses as described above, there is a case where delay due to the wireless communication occurs.

Here, a case is assumed where a user performs an operation input on an information processing apparatus on a receiving side, which displays on a display unit an image based on image data transmitted from an information processing apparatus on a transmission side, in order to perform an operation relating to the image. In such a case, it is assumed that time until the image based on the image data is displayed on the display unit in response to the operation input is delayed corresponding to the delay due to the wireless communication. It is assumed that the user feels uncomfortable if it takes a longer time until the image is displayed in response to the operation input as described above. In such a case, it is also assumed that the user becomes less interested. Thus, it is important to attract the user with an appropriate delay time.

It is desirable to provide an appropriate delay time.

Solution to Problem

Accordingly, some embodiments of the present application are directed to a first device for processing data. The first device includes at least one control circuit configured to adjust at least one parameter related to a delay time based on a measured value of the delay time. The measured value of the delay time is a difference between a first time associated with when the first device processes the data and a second time associated with when a second device processes the data. In some embodiments, the first device is a transmitting device for transmitting the data to the second device and the second device is a receiving device for receiving the data from the first device.

In some embodiments, the data comprises image data and/or sound data. The first time may be associated with when the first device processes the image data and the second time is associated with when the second device processes the image data. Alternatively, the first time may be an average of a when the first device processes the image data and when the first device processes the sound data, and the second time is an average of when the second device processes the image data and when the second device processes the sound data. In some embodiments, the first device includes a display circuit configured to display the image data.

In some embodiments, the first is a time that the data is reproduced by the first device. In other embodiments, the first time is the time that the data is transmitted by the first device to the second device. In some embodiments, the second time is a time that the data is reproduced by the second device. In other embodiments, the second time is the time that the data is received by the second device from the first device. In some embodiments, the first device includes an image capturing device configured to acquire an image of the data displayed by the second device, wherein the second time is based on the image acquired by the image capturing device. In other embodiments, the first time is based on first image data acquired by an external image capturing device, and the second time is based on second image data acquired by the external image capturing device. In some embodiments, the first time is based on an internal clock of the first device; the second time is based on an internal clock of the second device; and the internal clock of the first device is synchronized with the internal clock of the second device.

In some embodiments, the at least one parameter is an encoding parameter used to encode the image data and/or the sound data. In some embodiments, adjusting the at least one parameter comprises determining an optimal parameter based on a plurality of measured values of the delay time, wherein each of the plurality of measured values of the delay time is associated with a respective value of the at least one parameter.

In some embodiments, the first device includes at least one antenna and a wireless communication circuit configured to control transmitting the data to the second device wirelessly via the at least one antenna. In some embodiments, communication circuit is configured to transmit the data according to the Wi-Fi Display wireless network standard. In some embodiments, adjusting the at least one parameter comprises a capability negotiation procedure and/or a capability re-negotiation procedure of the Wi-Fi Display wireless network standard.

Some embodiments of the present application are directed to a method for operating a first device for processing data. The method includes adjusting at least one parameter related to a delay time based on a measured value of the delay time, wherein the measured value of the delay time is a difference between a first time associated with when the first device processes the data and a second time associated with when a second device processes the data.

Some embodiments of the present application are directed to at least one computer readable medium encoded with instructions that, when executed by at least one processor of a first device, performs a method. The method includes adjusting at least one parameter related to a delay time based on a measured value of the delay time, wherein the measured value of the delay time is a difference between a first time associated with when the first device processes the data and a second time associated with when a second device processes the data.

Advantageous Effects of Invention

According to the present technology, it is possible to achieve an excellent effect of providing an appropriate delay time.

BRIEF DESCRIPTION OF DRAWINGS

FIG. 3 is a diagram showing an example of content stored on an image information storage unit according to the embodiment of the present technology.

DESCRIPTION OF EMBODIMENTS

Hereinafter, a description will be given of an embodiment for implementing the present technology (hereinafter, referred to as an embodiment). The description will be given in the following order.

1. Embodiment (Parameter Setting Control: Example in Which Encoding Parameter Is Determined Based on Delay Time Due to Wireless Communication Between Transmitter and Receiver)

2. Modified Example

<1. Embodiment>

"Configuration Example of Communication System"

Figure 1:
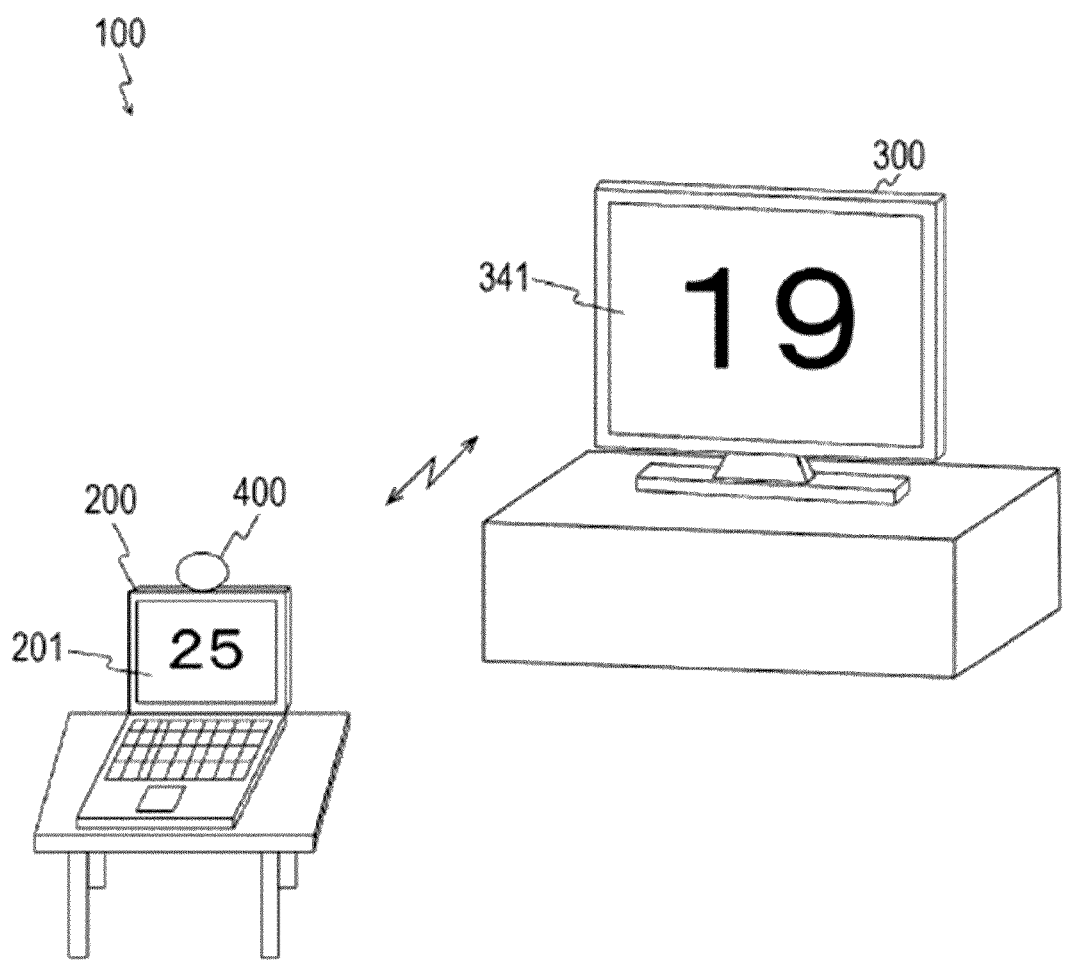
FIG. 1 is a diagram showing a configuration example of a communication system according to an embodiment of the present technology.

FIG. 1 is a diagram showing a configuration example of a communication system 100 according to an embodiment of the present technology. FIG. 1 shows an example of a system configuration when two information processing apparatuses (an information processing apparatuses 200 and 300) are directly connected in a wireless manner.

The communication system 100 includes the information processing apparatuses 200 and 300. The information processing apparatus 200 is a transmitter which is provided with a wireless communication function (for example, an electronic device which transmits images (video images) and sound through a network), for example. In addition, the information processing apparatus 300 is a receiver which is provided with a wireless communication function (for example, an electronic device which outputs images and sound received from a network), for example.

For example, the information processing apparatuses 200 and 300 are wireless communication apparatuses complying with Institute of Electrical and Electronics Engineers (IEEE) 802.11 Specification. In addition, the information processing apparatuses 200 and 300 can exchange various kinds of information by using the wireless communication function.

Here, it is possible to use a wireless Local Area Network (LAN), for example, as the wireless communication used by the communication system 100. For example. Wireless Fidelity (Wi-Fi) Direct. Tunneled Direct Link Setup (TDLS), or an ad hoc network can be used as the wireless LAN. In addition. Wi-Fi CERTIFIED Miracast can be used as near field wireless Audio Visual (AV) delivery communication used by the communication system 100, for example. Wi-Fi CERTIFIED Miracast is a mirroring technology in which sound and displayed video images reproduced by one terminal are transmitted to another terminal and the terminal is made to similarly output the sound and the video image data by using the Wi-Fi Direct or TDLS technology.

According to Wi-Fi CERTIFIED Miracast, a User Input Back Channel (UIBC) is implemented on a Transmission Control/Internet Protocol (TCP/IP). UIBC is a technology in which operation information of input devices such as a mouse and a keyboard is transmitted from one terminal to the other terminal. In addition, another remote desktop software (Virtual Network Computing (VNC), for example) may be applied instead of Wi-Fi CERTIFIED Miracast.

In addition, an imaging apparatus 400 is attached to the information processing apparatus 200. The imaging apparatus 400 is an imaging apparatus which images an object, generates image data, and outputs the generated image data to the information processing apparatus 200. Moreover, the imaging apparatus 400 obtains surrounding sound when the image data is generated and outputs data relating to the obtained sound (sound data) to the information processing apparatus 200. The imaging apparatus 400 is implemented by a web camera with a microphone, for example. Although an example in which the imaging apparatus 400 that is present as a separate electronic device is attached to the information processing apparatus 200 and used will be shown in the embodiment of the present technology, an information processing apparatus with a built-in imaging apparatus may be used.

In addition, the information processing apparatus 200 is a mobile-type information processing apparatus with a wireless communication function (for example, an electronic device with a camera mounted thereon (for example, a personal computer, a game device, a smartphone, or a tablet terminal)), for example. In addition, the information processing apparatus 300 is a display device (for example, a television, a projector, or a personal computer) or a mobile-type information processing apparatus (for example, a smartphone, or a tablet terminal) with a wireless communication function.

In addition, FIG. 1 shows an example in which the communication system 100 is used in a state where a display unit 341 of the information processing apparatus 300) can be imaged by using the imaging apparatus 400 attached to the information processing apparatus 200. For example, the information processing apparatus 200 can transmit image data and sound data by using wireless communication, and the information processing apparatus 300 can receive and output the image data and the sound data. In addition, the imaging apparatus 400 can capture an image to be displayed on the display unit 341 of the information processing apparatus 300 and output the image data to the information processing apparatus 200.

Here, there is a rule of Wi-Fi CERTIFIED Miracast that an image (video image) is compressed and developed by using H.264, for example. In addition, it is possible to adjust H.264 on the transmission side in Wi-Fi CERTIFIED Miracast, for example. For example, although appropriate parameters are set in many cases when a transmitter and a receiver are devices manufactured by a same company, problems such as delay easily occur when a transmitter and a receiver are devices manufactured by different companies. In addition, parameters of H.264 are often changed. Thus, it is important to set appropriate parameters. Thus, an example in which an appropriate encoding parameter is determined based on a delay time by wireless communication between a transmitter and a receiver will be shown in this embodiment of the present technology.

"Configuration Example of Information Processing Apparatus (Transmission Side)"

Figure 2:
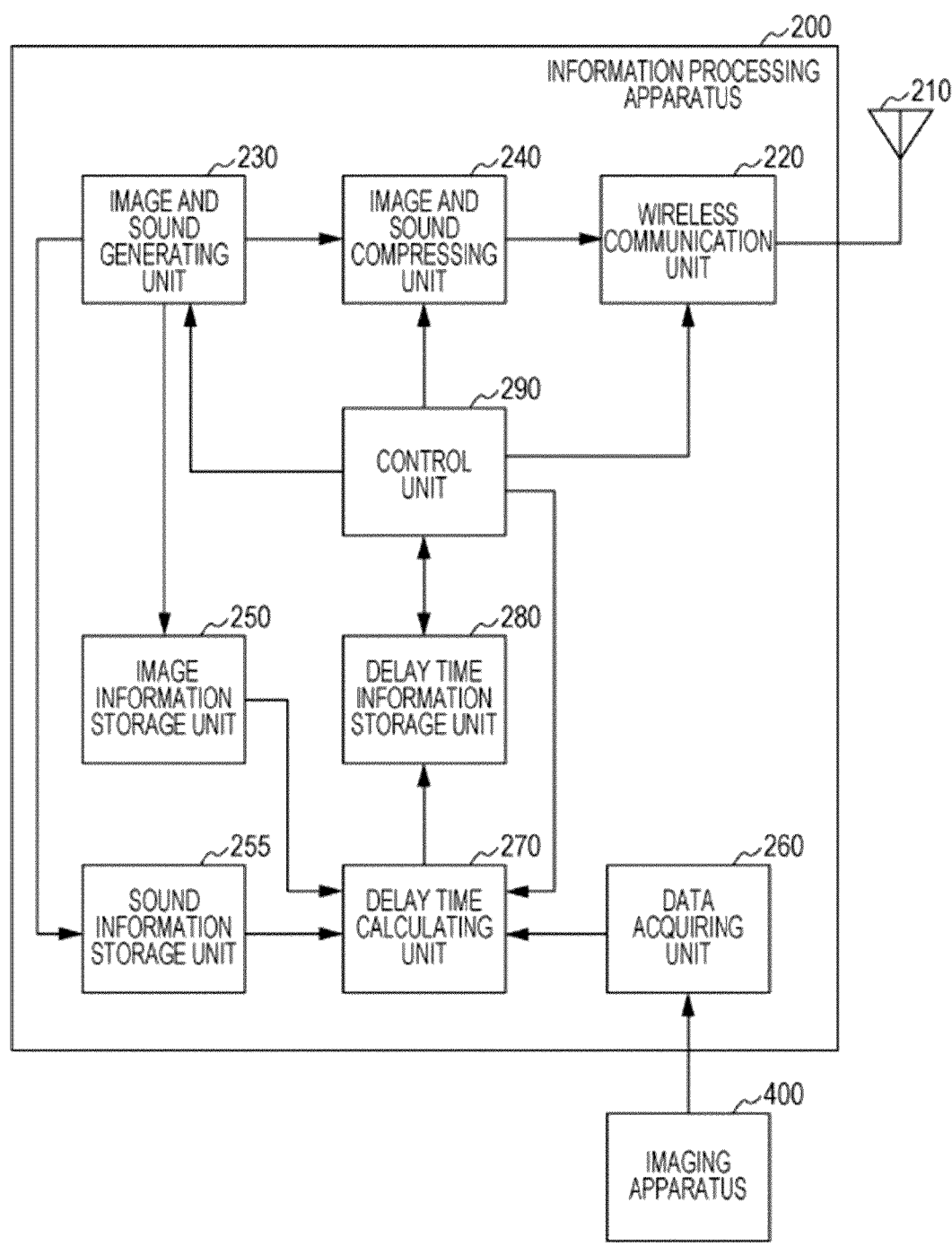
FIG. 2 is a block diagram showing a functional configuration example of an information processing apparatus according to the embodiment of the present technology.

FIG. 2 is a block diagram showing a functional configuration example of an information processing apparatus 200 according to the embodiment of the present technology.

The information processing apparatus 200 includes an antenna 210, a wireless communication unit 220, an image and sound generating unit 230, an image and sound compressing unit 240, an image information storage unit 250, and a sound information storage unit 255. In addition, the information processing apparatus 200 includes a data acquiring unit 260, a delay time calculating unit 270, a delay time information storage unit 280, and a control unit 290.

The wireless communication unit 220 is configured to exchange various kinds of information (for example, image data (video image data) and sound data) with another information processing apparatus (for example, the information processing apparatus 300) via the antenna 210 by using wireless communication. For example, when transmission processing of image data is performed, image data which is generated by the image and sound generating unit 230 is compressed by the image and sound compressing unit 240, and the compressed image data is transmitted from the antenna 210 via the wireless communication unit 220.

The image and sound generating unit 230 is configured to generate data as an output target (image data, sound data) and output the generated data to the image and sound compressing unit 240. For example, the image and sound generating unit 230 generates an image (display screen of a game, a CG screen, rendering, for example) to be displayed on a display unit 201 (shown in FIG. 1). In addition, the thus generated data is a target of transmission to another information processing apparatus (for example, the information processing apparatus 300). Moreover, the image and sound generating unit 230 causes the image information storage unit 250 to associate and store the generated image data with time information and causes the sound information storage unit 255 to associate and store the generated sound data with time information.

The image and sound compressing unit 240 is configured to compress (encode) the data (the image data and the sound data), which has been generated by the image and sound generating unit 230, by using an encoding parameter which is determined by the control unit 290. Then, the image and sound compressing unit 240 outputs the compressed data (the image data and the sound data) to the wireless communication unit 220. In addition, the image and sound compressing unit 240 may be implemented by execution of encoding by software or may be implemented by execution of encoding by hardware.

The image information storage unit 250 is configured to associate and store the image data, which has been generated by the image and sound generating unit 230, with time information and supply the stored information (image information) to the delay time calculating unit 270. In addition, content which is stored on the image information storage unit 250 will be described in detail with reference to FIG. 3A.

The sound information storage unit 255 is configured to associate and store the sound data, which has been generated by the image and sound generating unit 230, with time information and supply the stored information (sound information) to the delay time calculating unit 270. In addition, content which is stored on the sound information storage unit 255 will be described in detail with reference to FIG. 3B.

The data acquiring unit 260 is configured to acquire the image data and the sound data which have been generated by the imaging apparatus 400 and supply the acquired image data and sound data to the delay time calculating unit 270. That is, the data acquiring unit 260 is a data acquiring unit which acquires data output from another information processing apparatus.

The delay time calculating unit 270 is configured to calculate a delay time, which is generated when data is exchanged between the information processing apparatus 200 and another information processing apparatus (for example, the information processing apparatus 300), based on at least one of the image data and the sound data. Then, the delay time calculating unit 270 causes the delay time information storage unit 280 to store the calculated delay time.

For example, the delay time calculating unit 270 compares the image information which has been stored on the image information storage unit 250 with image data which has been acquired by the data acquiring unit 260 and calculates a delay time based on the comparison result. In addition, the delay time calculating unit 270 compares the sound information which has been stored on the sound information storage unit 255 with the sound data which has been acquired by the data acquiring unit 260 and calculates a delay time based on the comparison result, for example. Moreover, the delay time calculating unit 270 may calculate a delay time based on the image data comparison result and the sound data comparison result, for example. It is possible to calculate an average value of the image data comparison result (difference value) and the sound data comparison result (difference value) as a delay time. That is, the delay time calculating unit 270 acquires a delay time for data transmission to another information processing apparatus which uses the wireless communication. In addition, the delay time calculating unit 270 is an example of an acquiring unit.

The delay time information storage unit 280 associates and stores the encoding parameter which has been set for the image and sound compressing unit 240 with a delay time when the encoding parameter was set (the delay time which was calculated by the delay time calculating unit 270). Then, the delay time information storage unit 280 supplies the stored delay time information to the control unit 290. In addition, content which is stored on the delay time information storage unit 280 will be described in detail with reference to FIG. 4.

The control unit 290 is configured to control respective units in the information processing apparatus 200. For example, the control unit 290 performs control for transmitting the image data and the sound data, which have been generated by the image and sound generating unit 230, to the information processing apparatus 300. In addition, the control unit 290 performs control for setting the encoding parameter for the image and sound compressing unit 240.

Moreover, the control unit 290 performs control for determining setting content relating to data transmission to another information processing apparatus based on the delay time which has been calculated by the delay time calculating unit 270, for example. The setting content is a parameter to be used for encoding data to be transmitted to another information processing apparatus, for example. In such a case, the control unit 290 can sequentially set a plurality of parameters in order to measure the delay time for each parameter, for example. In addition, the control unit 290 can determine a parameter corresponding to a shortest delay time among delay times, which have been calculated by the delay time calculating unit 270, as the setting content.

In addition, although the information processing apparatus 200 can be provided with the display unit 201 (shown in FIG. 1), a sound output unit, an operation receiving unit, an indicator, and the like in addition to the aforementioned respective units, these components will not be shown in FIG. 2.

The display unit 201 is a display unit which displays an image generated by the image and sound generating unit 230, for example. In addition, it is possible to use a display panel such as an organic Electro Luminescence (EL) or a Liquid Crystal Display (LCD), for example, as the display unit 201. The indicator is an indicator which indicates whether or not a delay time is being measured.

The sound output unit (not shown) is a sound output unit (for example, a speaker) which outputs sound generated by the image and sound generating unit 230, for example. In addition, it is preferable to output an image from both a transmitter and a receiver and output sound from any one of the transmitter and the receiver. For this reason, a case where sound from the transmitter is picked up is not assumed.

The operation receiving unit (not shown) is an operation receiving unit which receives an operation input performed by a user and is a keyboard, a mouse, a game pad, a touch panel, or a camera, for example. In addition, it is possible to integrally configure the operation receiving unit and the display unit 201 by using a touch panel on which a user can input an operation by touching a display screen with their finger or causing the finger to approach the display screen.

"Examples of Content Stored on Image Information Storage Unit and Sound Information Storage Unit"

FIGS. 3A and 3B are diagrams which show examples of content stored on the image information storage unit 250 and the sound information storage unit 255 according to the embodiment of the present technology. FIGS. 3A and 3B show examples of stored content in a case where the image and sound generating unit 230 stores data on the respective storage units (the image information storage unit 250 and the sound information storage unit 255). FIG. 3A shows content which is stored on the image information storage unit 250, and FIG. 3B shows content which is stored on the sound information storage unit 255. In addition, the image information storage unit 250 and the sound information storage unit 255 are examples of storage units which store data to be transmitted to another information processing apparatus. That is, the image information storage unit 250 and the sound information storage unit 255 are examples of the storage units.

As shown in FIG. 3A, the image information storage unit 250 associates and stores image information 251 and time information 252. In addition, FIG. 3A shows an example of 30 fps.

The image information 251 is image data (frames) which has been generated by the image and sound generating unit 230. In FIG. 3A, only numbers for identifying image data (frames) will be shown in the image information 251 for simplifying the description.

The time information 252 is an elapsed time from a reference time. For example, a time at which the first image data (frame) was generated by the image and sound compressing unit 240 is regarded as the reference time, and an elapsed time from the reference time is sequentially recorded in the time information 252.

As described above, the image information storage unit 250 sequentially associates and records the image data (frames) which has been generated by the image and sound generating unit 230 with the time information (the elapsed time from the reference time) relating to the image data (frames). For example, recording is performed for each frame (for example, 33 msec).

As shown in FIG. 3B, the sound information storage unit 255 associates and stores sound information 256 with time information 257. In addition, FIG. 3B shows an example of 44,100 Hx.

The sound information 256 is sound data (a test sound "pop", for example) which has been generated by the image and sound generating unit 230. In FIG. 3B, only numbers for identifying sound data will be shown in the sound information 256 for simplifying the description.

The time information 257 is an elapsed time from a reference time. For example, a time at which the first image data (frame) was generated by the image and sound compressing unit 240) is regarded as a reference time, and an elapsed time from the reference time is sequentially recorded in the time information 257.

As described above, the sound information storage unit 255 sequentially associates and records the sound data which has been generated by the image and sound generating unit 230 with the time information (the elapsed time from the reference time) relating to the sound data.

Although FIGS. 3A and 3B show examples of stored content in a case where the image and sound generating unit 230) records data in the respective storage units, data may be sequentially recorded at regular time intervals by causing the respective storage units to make an inquiry to the image and sound generating unit 230 at the regular time intervals.

"Example of Content Stored on Delay Time Information Storage Unit"

Figure 4:
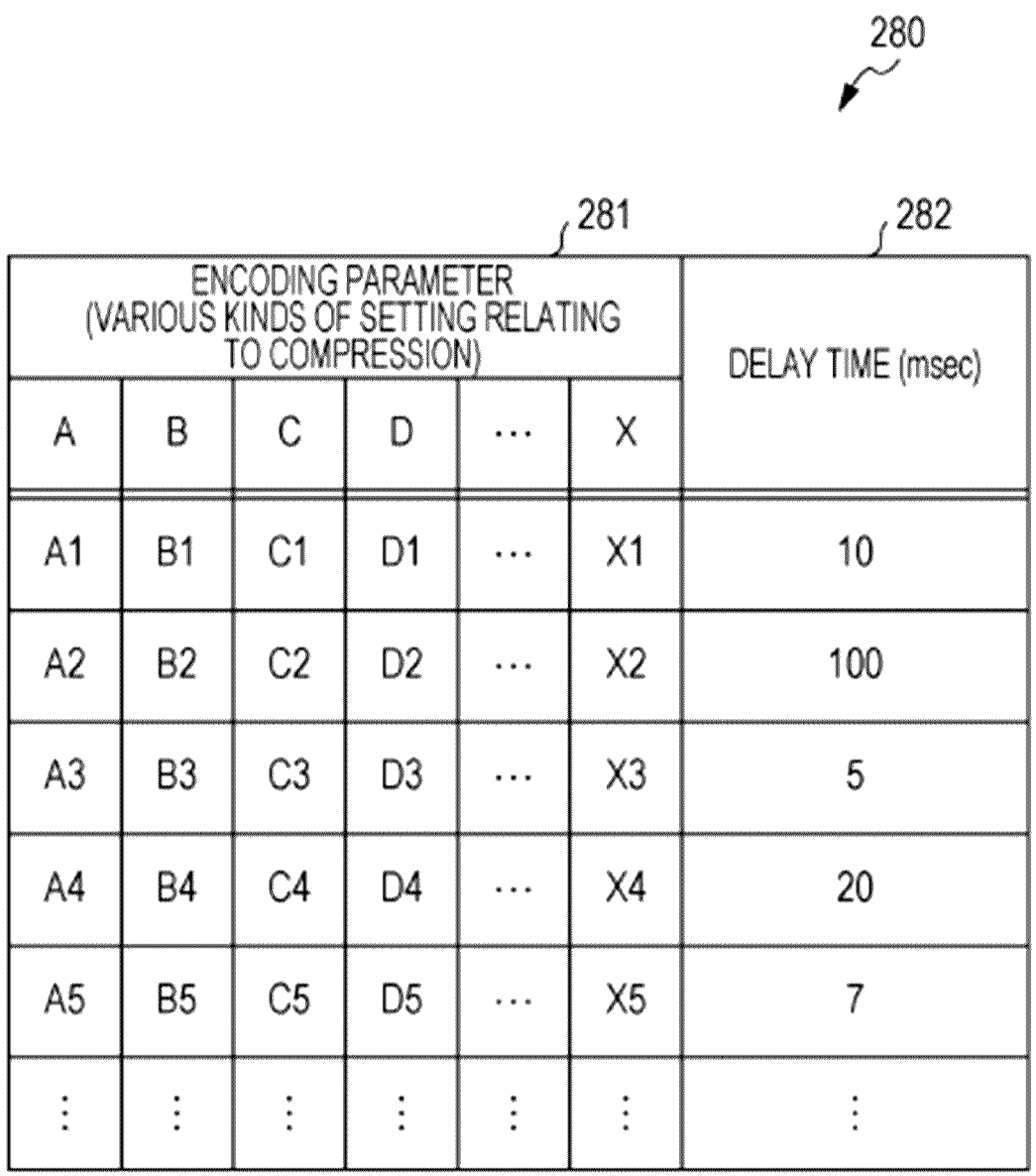
FIG. 4 is a diagram showing an example of content stored on a delay time information storage unit according to the embodiment of the present technology.

FIG. 4 is a diagram showing an example of content which is stored on the delay time information storage unit 280 according to the embodiment of the present technology.

The delay time information storage unit 280 associates and stores an encoding parameter 281 with a delay time 282.

The encoding parameter 281 is a parameter (encoding parameter) used by the image and sound compressing unit 240 to compress (encode) image data to be transmitted. The encoding parameter is set by the control unit 290.

The delay time 282 is a delay time which is calculated by the delay time calculating unit 270. That is, an encoding parameter and a delay time are sequentially recorded for each combination (from A to X, for example) of the encoding parameters set for the image and sound compressing unit 240.

As described above, the delay time information storage unit 280 stores the delay time which has been calculated by the delay time calculating unit 270 (a delay time measured for a plurality of parameters used for data transmission to the information processing apparatus 300) for each parameter.

"Example of Relationship Between Encoding Parameter and Delay Time"

Here, a description will be given of a relationship between an encoding parameter and a delay time. Here, some examples among encoding parameters (compression parameters) relating to the delay time will be described in relation to H.264 which has been widely used as a moving image compression method in recent years.

"Compression Ratio (Bit Rate)"

Basically, it is possible to reduce a band frequency necessary for transmitting image data by increasing a compression ratio and decreasing a value of a bit rate. By reducing a band frequency necessary for transmitting image data as described above, it is possible to reduce a case where image data becomes missing in a course of transmission and re-forwarding processing is necessary and thereby to reduce delay even in a case where a network becomes overcrowded to some extent.

"Resolution of Image"

Typically, a calculation amount necessary for compression and development increases as resolution increases, and it takes a longer time for compression processing and development processing. It is considered that a delay time increases as image resolution increases for the above reason.

"Whether or not Bi-Directional Predicted Frame (B Frame) is Used"

B frame is a frame which is predicted from Intra-coded Frames (I frames) positioned before and after a frame on a time axis. That is, it is not possible to display the B frame as long as the I frame positioned after the B frame on the time axis is not received. For this reason, a delay time from transmission of the B frame by a transmitter until display of the B frame by a receiver increases. Basically, the B frame is not used in many cases for an application for which a real time property is necessary.

"Range of Motion Search"

Motion search processing is processing for detecting how much and in which direction an object has moved in two continuous frames. In the motion search processing, an upper limit of a search range is set in advance in many cases. When setting is made for search in a relatively wide range, it is possible to increase a compression ratio of an entire video image while a load when a transmitter performs encoding processing in image data increases. For this reason, there is a possibility that it takes a longer time until frame delivery when the setting is made for search in the relatively wide range.

"Whether or not Slice Encoding is Used"

Slice encoding is processing in which a frame is divided into a plurality of blocks and the respective blocks are compressed instead of compressing one entire frame. Since it is possible to partially transmit a frame without waiting for completion of compression of one entire frame if slice encoding is used, it is possible to reduce a delay time.

"Usage of Deblocking Filter"

Although it is possible to enhance image quality if a deblocking filter is used, a load on a decoder in H.264 increases, and a processing amount of a receiver increases. For this reason, it is preferable not to employ a deblocking filter when decoding is performed in a relatively short time.

Here, a case where a built-in encoder in a transmitter or a built-in decoder in a receiver is designed for a specific use purpose is assumed. In such a case, there is a possibility that changes in parameters (for example, a number of reference frames, a profile, a level, and the like) other than the aforementioned parameter contributes to an increase and a decrease in a delay time. In addition, outputs of image data and sound data are delayed in some cases in a part of receivers if time stamp information included in a video image stream and a sound stream has not appropriately been set. In addition, the time stamp information is referred to as a Presentation Time Stamp (PTS) or a Decoding Time Stamp (DTS).

In addition, when the information processing apparatus which performs wireless communication can use a plurality of codecs, it is preferable to select a codec which relatively decreases a delay time. For example. MotionJPEG independently compresses each frame (that is, MotionJPEG does not perform compression between frames). For this reason, it is possible to output a frame immediately after receiving data of the frame regardless of receiving conditions of other frames. In addition, a calculation amount necessary for compression and development is small in MotionJPEG, for example, and therefore, it is possible to reduce a time necessary for calculation. For this reason, it is possible to reduce a delay time further by using MotionJPEG than by using H.264 for compressing image data, for example.

"Configuration Example of Information Processing Apparatus (Receiving Side)"

Figure 5:
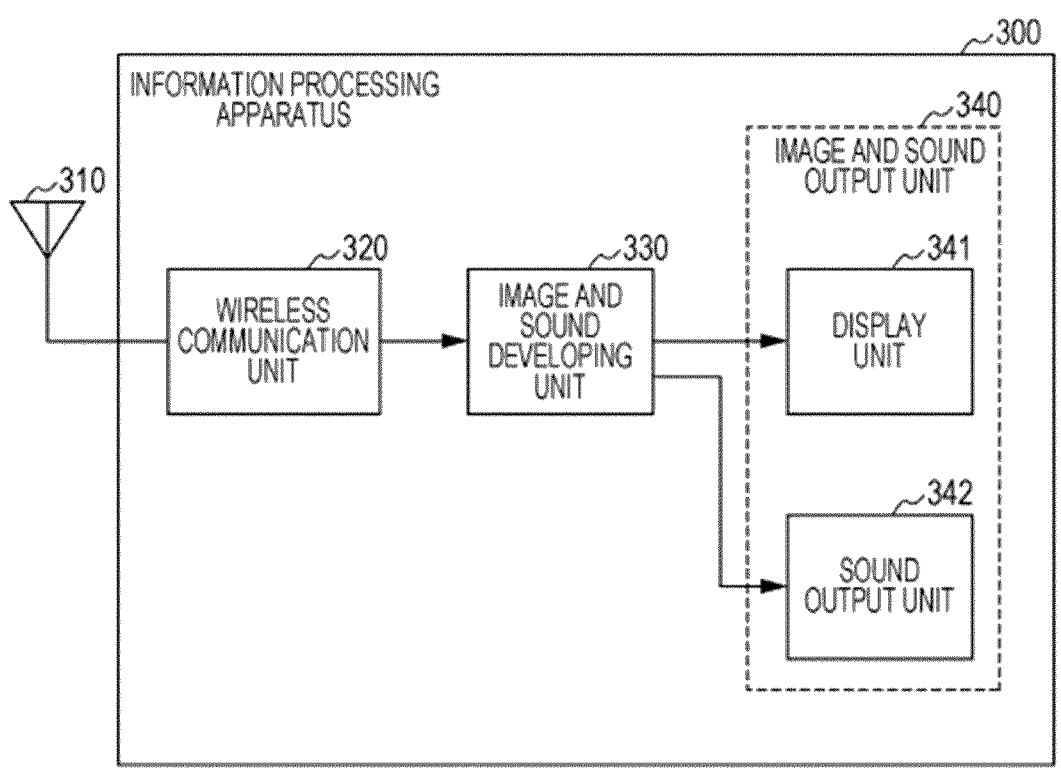
FIG. 5 is a block diagram showing a functional configuration example of an information processing apparatus according to the embodiment of the present technology.

FIG. 5 is a block diagram showing a functional configuration example of the information processing apparatus 300 according to the embodiment of the present technology.

The information processing apparatus 300 includes an antenna 310, a wireless communication unit 320, an image and sound developing unit 330, and an image and sound output unit 340.

The wireless communication unit 320 is configured to exchange various kinds of information (for example, image data and sound data) with another information processing apparatus (for example, the information processing apparatus 200) via the antenna 310 by using wireless communication. For example, when image data receiving processing is performed, image data which has been received by the antenna 310 is developed (decoded) by the image and sound developing unit 330 via the wireless communication unit 320, and the developed image data is supplied to the display unit 341. Then, an image corresponding to the developed image data is displayed on the display unit 341.

The image and sound developing unit 330 is configured to develop (decode) data (image data and sound data) which has been output from the information processing apparatus 200 and output the developed data (image data and sound data) to the image and sound output unit 340. In addition, the image and sound developing unit 330 may be implemented by execution of decoding by software or may be implemented by execution of decoding by hardware.

The image and sound output unit 340 includes the display unit 341 and a sound output unit 342.

The display unit 341 is a display unit which displays respective images (for example, a display screen shown in FIG. 1) based on image data which has been developed by the image and sound developing unit 330. In addition, it is possible to use a display panel such as an organic EL panel or an LCD panel, for example, as the display unit 341. In addition, a touch panel on which a user can input an operation by touching a display screen with their finger or causing their finger to approach the display screen may be used as the display unit 341.

The sound output unit 342 is a sound output unit (for example, a speaker) which outputs various kinds of sound (sound of a movie, sound of a game, and the like) based on sound data which has been developed by the image and sound developing unit 330.

"Communication Example"

Figure 6:
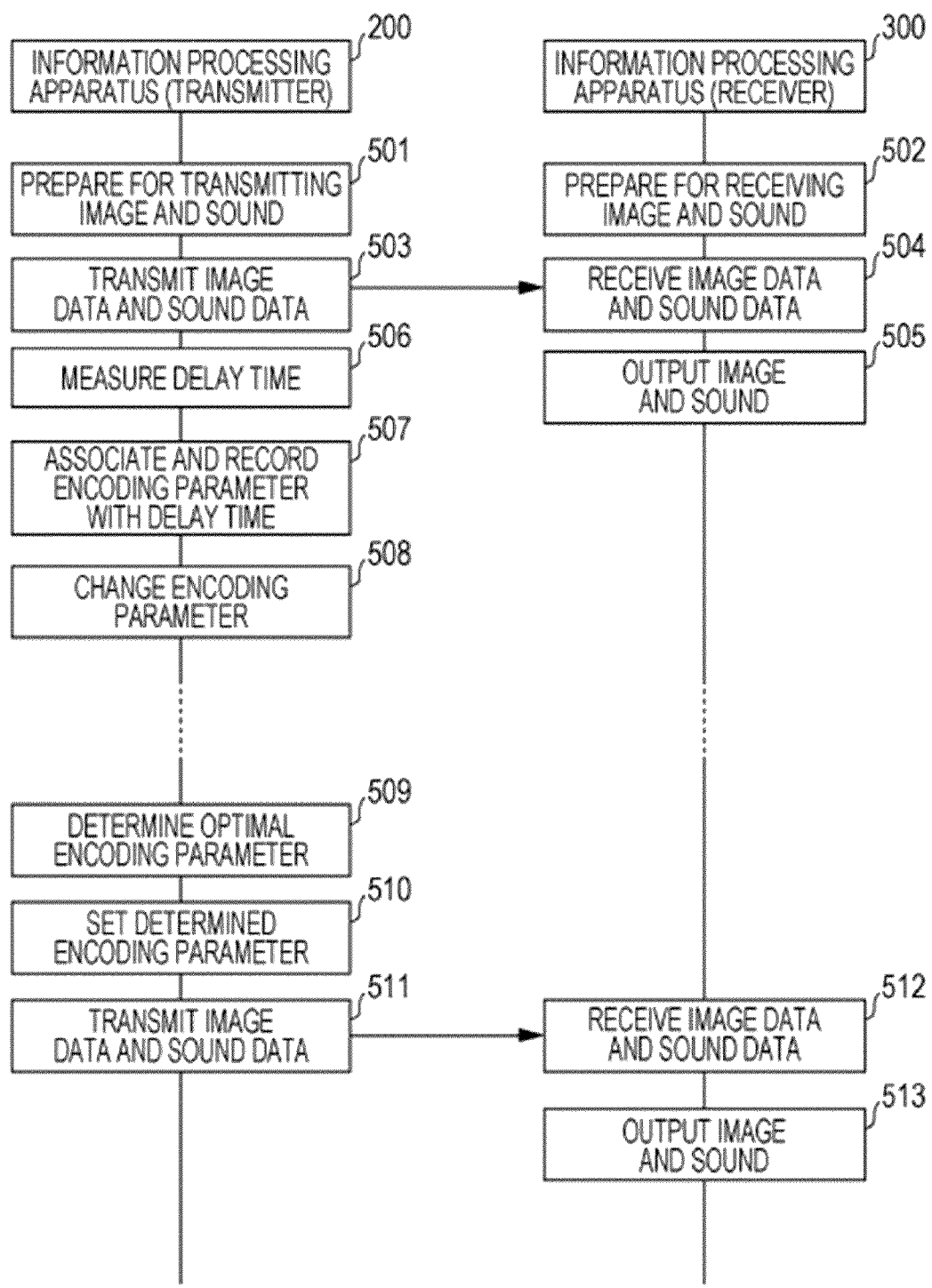
FIG. 6 is a sequence chart showing a communication processing example between respective apparatuses which configure the communication system according to the embodiment of the present technology.

FIG. 6 is a sequence chart showing an example of communication processing between respective apparatuses which configure the communication system 100 according to the embodiment of the present technology. In addition, FIG. 6 shows a communication processing example in a case where test information is exchanged first between the information processing apparatus 200 on the transmission side and the information processing apparatus 300 on the receiving side. Here, the test information is at least one of test image data for measuring a delay time and test sound data for measuring a delay time, for example. In addition, an image (test image) displayed based on the test image data is an image with a number attached for each frame, for example. Moreover, sound (test sound) output based on the test sound data is a predetermined sound (for example, "pop") set at intervals of a predetermined number of frames.

First, the information processing apparatus 200 on the transmission side prepares for image and sound transmission for transmitting image data and sound data to the information processing apparatus 300 on the receiving side (501). The preparation includes processing for initializing the wireless communication unit 220, the image and sound compressing unit 240, the image information storage unit 250, the sound information storage unit 255, and the delay time information storage unit 280, for example. In addition, the control unit 290 of the information processing apparatus 200 on the transmission side sets an initial value of the encoding parameter for the image and sound compressing unit 240 in this preparation.

Here, the wireless communication unit 220 may be controlled at this timing of the preparation (501) so as to establish network connection with a receiver (the information processing apparatus 300 on the receiving side) depending on a type of used network. For example, in a case of Wi-Fi CERTIFIED Miracast, it is possible to establish network connection with the receiver in a series of operations such as Wi-Fi Direct (WFD) Connection Setup and the like. The series of operations are WFD Device Discovery, WFD Service Discovery (Optional), and WFD Connection Setup, for example. In addition, WFD Device Discovery is processing for discovering a counterpart device. WFD Service Discovery is processing for acquiring detailed information of the counterpart device. WFD Connection Setup is processing for establishing network connection with the counterpart device.

In addition, setting information may be exchanged with the receiver at this timing of the preparation (501) depending on a delivery scheme of the image data and the sound data. For example, in a case of Wi-Fi CERTIFIED Miracast, presetting called Capability Negotiation is performed at this timing. Here. Capability Negotiation is processing for exchanging a message sequence using a Real Time Streaming Protocol (RTSP) between WFD Source and WFD Sink after completing connection setup by WFD before WFD session establishment.

In addition, the information processing apparatus 300 on the receiving side prepares for image and sound reception for receiving the image data and the sound data from the information processing apparatus 200 on the transmission side (502). The preparation includes processing for initializing the wireless communication unit 320, the image and sound developing unit 330, and the image and sound output unit 340.

Here, the wireless communication unit 320 may be controlled at this timing of the preparation (502) so as to establish network connection with the transmitter (the information processing apparatus 200 on the transmission side) depending on a type of the used network in the same manner as the information processing apparatus 200 on the transmission side. In addition, setting information may be exchanged with the transmitter at this timing of the preparation (502) depending on a delivery scheme of the image data and the sound data. Since the respective processing is the same as that by the information processing apparatus 200 on the transmission side, a description thereof will be omitted here.

Next, the information processing apparatus 200 on the transmission side starts transmission of the image data and the sound data to the information processing apparatus 300 on the receiving side (503). In addition, the information processing apparatus 200 on the transmission side causes the respective storage units (the image information storage unit 250 and the sound information storage unit 255) to sequentially record the image data and the sound data, which have been generated by the image and sound generating unit 230, at the same time as the transmission of the image data and the sound data (503).

Specifically, the image data and the sound data which have been generated by the image and sound generating unit 230 are compressed by the image and sound compressing unit 240. Then, the compressed image data and sound data are transmitted as a stream to the information processing apparatus 300 on the receiving side via the wireless communication unit 220 (503). In addition, the image data which has been generated by the image and sound generating unit 230 is sequentially recorded in the image information storage unit 250, and the sound data which has been generated by the image and sound generating unit 230 is sequentially recorded in the sound information storage unit 255 (503).

In addition, the image data and the sound data which have been generated by the image and sound generating unit 230 are sequentially transmitted and recorded thereafter in the same manner. A case where storage capacity of the image information storage unit 250 and the sound information storage unit 255 is limited can be assumed. In such a case, only the latest data (for example, data in last predetermined seconds) from the image data and the sound data which have been generated by the image and sound generating unit 230 may be recorded in the image information storage unit 250 and the sound information storage unit 255.

In addition, the information processing apparatus 300 on the receiving side starts receiving of the stream (the compressed image data and sound data) from the information processing apparatus 200 on the transmission side (504). Specifically, if the stream from the information processing apparatus 200 on the transmission side is received by the wireless communication unit 320, the received stream is input to and developed by the image and sound developing unit 330. Then, the developed image data and sound data are output from the image and sound output unit 340 (505).

Subsequently, the data acquiring unit 260 of the information processing apparatus 200 on the transmission side acquires the image data and the sound data which have been generated by the imaging apparatus 400. Then, the delay time calculating unit 270 of the information processing apparatus 200 on the transmission side calculates a delay time of the image data based on the acquired image data and the image data which has been stored on the image information storage unit 250 (506). In addition, the delay time calculating unit 270 of the information processing apparatus 200 on the transmission side calculates a delay time of the sound data based on the acquired sound data and the sound data which has been stored on the sound information storage unit 255 (506). That is, the delay time is measured (506).

Specifically, the delay time calculating unit 270 extracts image data, which coincides with the image data acquired by the data acquiring unit 260, from the image information storage unit 250. For example, the delay time calculating unit 270 can recognize a numerical value included in the image data based on a character recognition technology (for example, template matching processing). Then, the delay time calculating unit 270 calculates a delay time based on the time information, which has been associated with the extracted image data, and a present time. For example, a difference value between the time information which has been associated with the extracted image data and the present time is calculated, and the difference value is calculated as a delay time.

In relation to the sound data, a delay time can be calculated in the same manner. That is, the delay time calculating unit 270 extracts sound data, which coincides with the sound data acquired by the data acquiring unit 260, from the sound information storage unit 255. For example, the delay time calculating unit 270 can recognize specific sound data (for example, "pop") based on a sound recognition technology (for example, sound signal (waveform) matching processing). Then, the delay time calculating unit 270 calculates a delay time based on time information, which has been associated with the extracted sound data, and a present time. For example, a difference value between the time information which has been associated with the extracted sound data and the present time is calculated, and the difference value is calculated as a delay time.

As described above, the delay time calculating unit 270 can calculate a delay time based on a comparison result of the image data and a comparison result of the sound data.

In addition, the measurement of such a delay time is performed for several seconds to several tens of seconds as necessary. For example, if the measurement of a delay time is performed for a long time, an average value of the measured delay time can be obtained and regarded as a delay time. It is possible to enhance precision of the measured delay time by increasing the measurement time of a delay time.

Here, a case where the delay time calculated by using image data is different from the delay time calculated by using sound data can be assumed. In such a case, the delay time based on the image data may be used with a priority, or an average value of the delay time calculated by using the image data and the delay time calculated by using the sound data may be used.

Although a delay time is measured by using both image data and sound data in this example, a delay time may be measured by using any one of the image data and the sound data.

Subsequently, the delay time calculating unit 270 of the information processing apparatus 200 on the transmission side causes the delay time information storage unit 280 to associate and record the delay time obtained by the measurement with the encoding parameter (various kinds of setting relating to the compression) which has been set in the image and sound compressing unit 240 (507).

Then, the control unit 290 of the information processing apparatus 200 on the transmission side determines whether or not another encoding parameter which can be tried is present. Then, if there is another encoding parameter which can be tried, the control unit 290 of the information processing apparatus 200 on the transmission side changes the setting content in the image and sound compressing unit 240 to another encoding parameter (508).

If the setting of the encoding parameter has been changed as described above (508), the image data and the sound data which have been generated by the image and sound generating unit 230 are compressed by the image and sound compressing unit 240 by using the encoding parameter after the change. Then, the compressed image data and sound data are transmitted as a stream to the information processing apparatus 300 on the receiving side via the wireless communication unit 220 (503). In addition, the image data which has been generated by the image and sound generating unit 230 is sequentially recorded in the image information storage unit 250, and the sound data which has been generated by the image and sound generating unit 230 is sequentially recorded in the sound information storage unit 255 (503).

The information processing apparatus 200 on the transmission side changes the encoding parameter in the process while the information processing apparatus 300 on the receiving side does not perform special processing in response to the change as described above. That is, all the information processing apparatus 300 on the receiving side has to do is receiving and sequentially outputting the stream (the image data and the sound data) which has been transmitted from the information processing apparatus 200 on the transmission side. However, the information processing apparatus 200 on the transmission side can explicitly notify the change of the encoding parameter as will be described below. In such a case, the information processing apparatus 300 on the receiving side may initialize the image and sound developing unit 330 and the image and sound output unit 340 again based on the notification.

In addition, the information processing apparatus 200 can omit parameters, which are not compatible with the information processing apparatus 300 on the receiving side, without any trial when the information processing apparatus 200 somehow knows encoding parameters which are compatible with the information processing apparatus 300 on the receiving side. For example, in a case of Wi-Fi CERTIFIED Miracast, a transmitter can obtain a type of a movie image format, resolution, and the like supported by a receiver through the aforementioned procedure of Capability Negotiation. For this reason, it is possible to omit in advance parameters which are not supported by the receiver by checking the thus obtained information relating to the receiver (a type of a movie image format, resolution, and the like supported by the receiver) when the transmitter changes parameters.

In addition, the transmitter may temporarily suspend the transmission of previous streams and notify the receiver that another type of stream is to be transmitted, before transmitting the stream by using a new encoding parameter.

In addition, it is also possible to explicitly notify the receiver of the change of the encoding parameter through another route depending on a delivery scheme. For example, in a case of Wi-Fi CERTIFIED Miracast, the notification can be made by a system called Capability Re-negotiation. Here, Capability Re-negotiation is designed to notify WFD Sink of changes in image (video image) resolution and a frame rate in advance from WFD Source. In addition, WFD Source can appropriately update the parameter in WFD Session by using an RTSP protocol. For example, it is possible to independently expand a standard of Wi-Fi CERTIFIED Miracast and update further various parameters by the RTSP protocol. Then, a delay time may be measured (506) by using the updated parameters.

In addition, if the setting of the encoding parameter has been changed (508), the information processing apparatus 200 on the transmission side measures a delay time for the newly set encoding parameter (506) and records the delay time and the like (507). That is, the measurement of a delay time (506) and recording of the delay time and the like (507) are repeatedly performed every time the setting of the encoding parameter is changed (508).

In addition, if the measurement of a delay time (506) and recording of the delay time and the like (507) have been performed for all the encoding parameters which can be tried, an optimal encoding parameter is extracted among the encoding parameters which have been tried (509). Specifically, the control unit 290 of the information processing apparatus 200 on the transmission side extracts a minimum value among the delay times stored on the delay time information storage unit 280 and extracts an encoding parameter which has been associated and stored with the extracted minimum delay time (509). For example, when a delay time is recorded as shown in FIG. 4, the minimum value "5" is extracted, and the encoding parameter "A3 to X3" which has been associated and stored with the extracted minimum delay time is extracted (509). That is, an optimal encoding parameter is determined (509).

Subsequently, the control unit 290 of the information processing apparatus 200 on the transmission side sets the determined encoding parameter in the image and sound compressing unit 240 (510). Then, the information processing apparatus 200 on the transmission side starts transmission of the compressed image data and sound data by using the newly set encoding parameter (511).

For example, when the measurement is being performed (501 to 510), it is possible to display that the measurement is being performed by an indicator indicating that the measurement is being performed. In addition, a user may be notified of the fact that the measurement is being performed by message display on a display screen.

In addition, the information processing apparatus 300 on the receiving side starts receiving of the stream (the compressed image data and sound data) from the information processing apparatus 200 on the transmission side (512) and outputs the received image data and sound data from the image and sound output unit 340 (513).

In addition, the information processing apparatus 200 on the transmission side may temporarily suspend the transmission of the previous streams before transmitting a stream by using the new encoding parameter. In addition, the information processing apparatus 200 on the transmission side may notify the information processing parameter 300 on the receiving side of the new encoding parameter by using another route before transmitting the stream with the use of the new encoding parameter.

Although FIG. 6 shows an example in which a delay time is measured when test information is exchanged, a delay time may be measured when normal information is exchanged. For example, it is possible to periodically or non-periodically measure a delay time when image data and sound data relating to a game are exchanged when a user is playing the game by using the communication system 100. In such a case, an optimal encoding parameter may be periodically or non-periodically determined to appropriately set an optimal encoding parameter.

In such a case, when image data which coincides with the image data acquired by the data acquiring unit 260 is extracted from the image information storage unit 250, it is possible to extract the image data based on an absolute value of a difference value of luminance of each pixel in the image data, for example. For example, two image data which are targets to be compared (the image data acquired by the data acquiring unit 260 and the image data stored in the image information storage unit 250) are set to be same size, and the absolute value of the luminance difference value of each pixels in each image data. Then, it is possible to extract image data with the smallest absolute value of the calculated luminance difference value (image data in the image information storage unit 250) as the image data which coincides with the image data acquired by the data acquiring unit 260, from the image information storage unit 250.

"Operation Example of Information Processing Apparatus (Transmission Side)"

Figure 7:
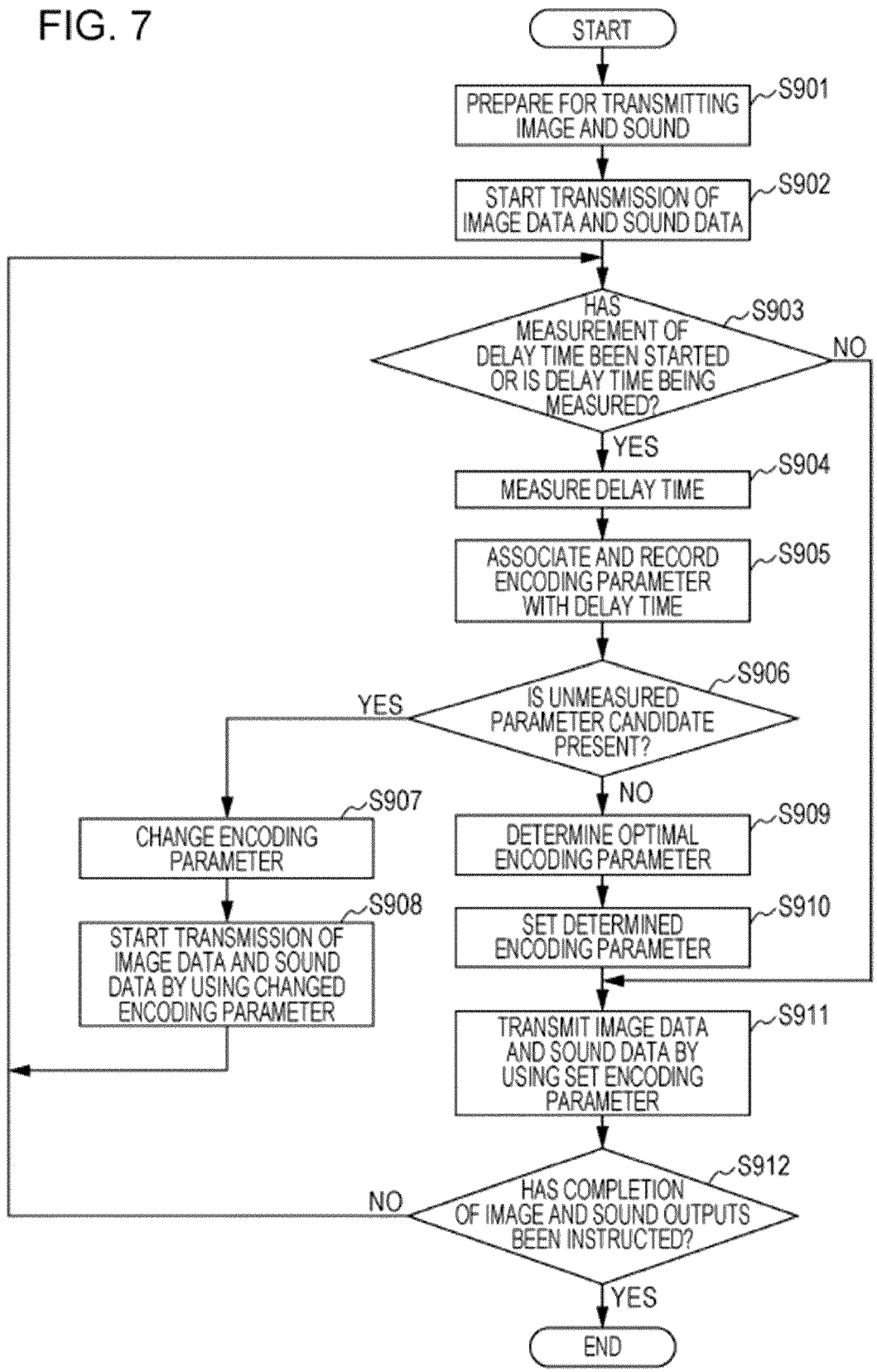
FIG. 7 is a flowchart showing a procedure example of parameter setting control processing by the information processing apparatus according to the embodiment of the present technology.

FIG. 7 is a flowchart showing an example of a procedure of parameter setting control processing by the information processing apparatus 200 according to the embodiment of the present technology. In this example, the information processing apparatus 2100 on the transmission side and the information processing apparatus 300 on the receiving side perform wireless communication.

First, the control unit 290 prepares for image and sound transmission for transmitting image data and sound data to the information processing apparatus 300 on the receiving side (Step S901). This preparation includes processing for initializing the wireless communication unit 220, the image and sound compressing unit 240, the image information storage unit 250, the sound information storage unit 255, and the delay time information storage unit 280, for example. In addition, the control unit 290 sets an initial value of the encoding parameter for the image and sound compressing unit 240 in this preparation.

Subsequently, the control unit 290 performs control for starting transmission of the image data and the sound data to the information processing apparatus 300 on the receiving side (Step S902). In addition, the control unit 290 performs control so as to cause the respective storage units (the image information storage unit 250 and the sound information storage unit 255) to sequentially record the image data and the sound data which have been generated by the image and sound generating unit 230 (Step S902).

Subsequently, it is determined whether the measurement of a delay time has been started or the delay time is being measured (Step S903). If the measurement of a delay time has not been started and the delay time is not being measured (Step S903), the processing proceeds to Step S911.

On the other hand, if the measurement of a delay time has been started or the delay time is being measured (Step S903), the measurement of the delay time is performed (Step S904). That is, the delay time calculating unit 270 calculates a delay time of the image data based on the image data which has been acquired by the data acquiring unit 260 and the image data which has been stored on the image information storage unit 250 (Step S904). In addition, the delay time calculating unit 270 calculates a delay time of the sound data based on the acquired sound data and the sound data which has been stored on the sound information storage unit 255 (Step S904). In addition, Step S904 is an example of the acquiring procedure.

Subsequently, the delay time calculating unit 270 causes the delay time information storage unit 280 to associate and record the delay time which has been acquired by the measurement with the encoding parameter (various kinds of setting relating to the compression) set for the image and sound compressing unit 240 (Step S905).

Subsequently, the control unit 290 determines whether or not another encoding parameter which can be tried is present (Step S906). Then, when there is another encoding parameter which can be tried (Step S906), the control unit 290 changes the setting content in the image and sound compressing unit 240 to another encoding parameter (Step S907).

Subsequently, the control unit 290 performs control for starting transmission of the image data and the sound data by using the encoding parameter after the change (Step S908). In addition, the control unit 290 performs control for causing the respective storage units (the image information storage unit 250 and the sound information storage unit 255) to sequentially record the image data and the sound data which have been generated by the image and sound generating unit 230 (Step S908) and returns to Step S903.

Subsequently, if another encoding parameter which can be tried is not present (Step S906), the control unit 290 determines an optimal encoding parameter among the encoding parameters which have been tried (Step S909). In addition, Step S909 is an example of a control procedure. Subsequently, the control unit 290 sets the determined encoding parameter in the image and sound compressing unit 240 (Step S910). Then, the control unit 290 performs control for starting transmission of the image data and the sound data by using the newly set encoding parameter (Step S911).

Subsequently, it is determined whether or not completion of image and sound outputs has been instructed (Step S912), and if completion of the image and sound outputs has not been instructed, the processing returns to Step S903. On the other hand, if completion of the image and sound outputs has been instructed (Step S912), the operations in the parameter setting control processing are completed.

"Operation Example of Information Processing Apparatus (Receiving Side)"

Figure 8:
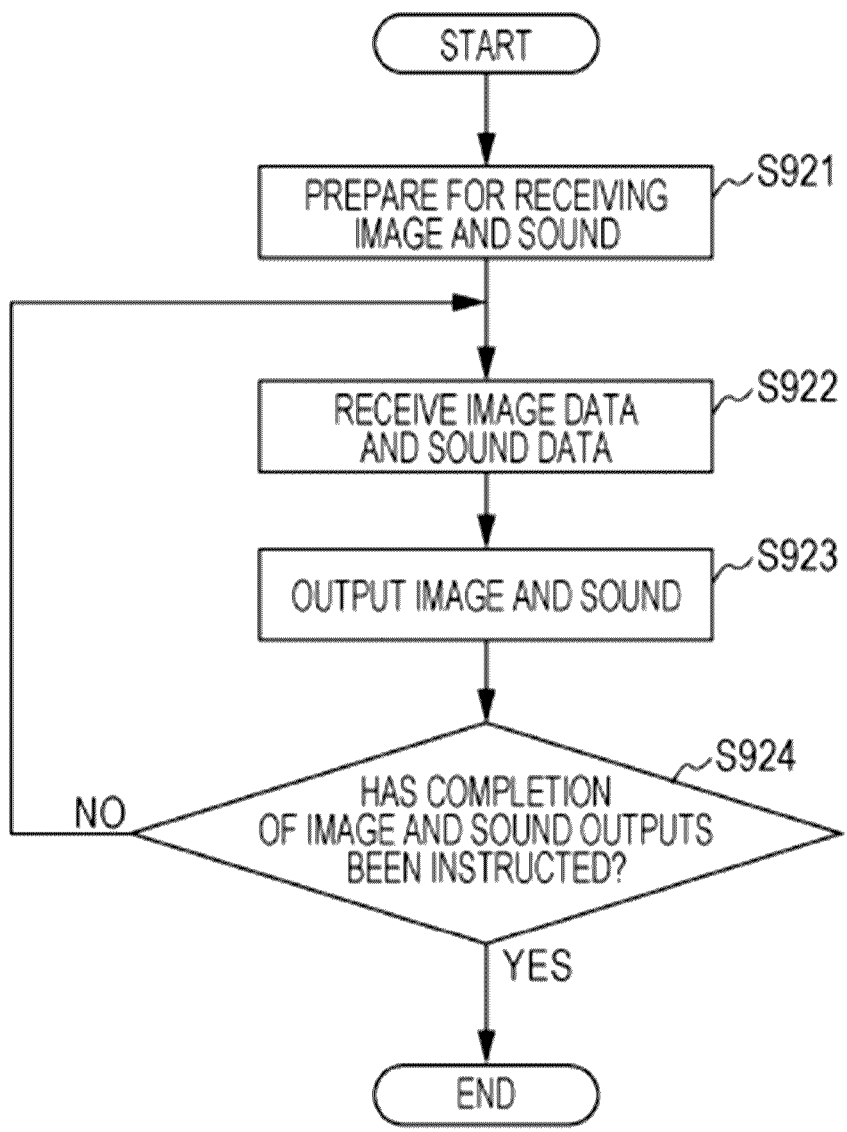
FIG. 8 is a flowchart showing a procedure example of data receiving processing by the information processing apparatus according to the embodiment of the present technology.

FIG. 8 is a flowchart showing an example of a procedure for data receiving processing by the information processing apparatus 300 according to the embodiment of the present technology. In this example, the information processing apparatus on the transmission side 200 and the information processing apparatus 300 on the receiving side perform wireless communication.

First, preparation for image and sound reception for receiving the image data and the sound data from the information processing apparatus 200 on the transmission side is performed (Step S921). This preparation includes processing for initializing the wireless communication unit 320, the image and sound developing unit 330, and the image and sound output unit 340, for example.

Subsequently, the stream (the compressed image data and the sound data) is received from the information processing apparatus 200 on the transmission side (Step S922). Then, the received stream is input to and developed by the image and sound developing unit 330, and the developed image data and sound data are output from the image and sound output unit 340 (Step S923).

Subsequently, it is determined whether or not completion of image and sound output has been instructed (Step S924), and if the completion of image and sound outputs has not been instructed, the processing returns to Step S922. On the other hand, if the completion of the image and sound outputs has been instructed (Step S924), the operations for data receiving processing are completed.

"Use Case Example"

Here, a description will be given of a use case example with reference to FIG. 1.

While the aforementioned respective processing from Step S901 to Step S908 is being executed, it is necessary for the imaging apparatus 400 to appropriately acquire the image and the sound which are output from the information processing apparatus 300 on the receiving side. For this reason, it is necessary for a user of the information processing apparatus 200 on the transmission side to direct an optical axis direction of the imaging apparatus 400 to the display unit 341 of the information processing apparatus 300 on the receiving side. For example, it is necessary for the user to employ some measures of locating a desk in front of the information processing apparatus 300 on the receiving side, placing the information processing apparatus 200 on the transmission side on the desk, and directing the optical axis of the imaging apparatus 400 to the display unit 341 of the information processing apparatus 300 on the receiving side as shown in FIG. 1. In addition, the user may direct the optical axis direction of the imaging apparatus 400 to the display unit 341 of the information processing apparatus 300 on the receiving side by tightly holding the information processing apparatus 200 on the transmission side with a hand. In addition, an application capable of checking whether or not the imaging apparatus 400 is able to appropriately acquire an image and sound may be executed on the information processing apparatus 200 on the transmission side.

In addition, if the respective processing from Step S901 to Step S908 has been completed, information for notifying that the processing has been completed may be output from the information processing apparatus 200 on the transmission side or the information processing apparatus 300 on the receiving side. For example, a message of the notification can be displayed on the display unit 201 of the information processing apparatus 200 on the transmission side or the display unit 341 of the information processing apparatus 300 on the receiving side. In doing so, the user can easily know a period during which it is necessary for the user to direct the imaging apparatus 400 to the information processing apparatus 300 on the receiving side.

For example, various games (for example, action games, fighting games, car races) can be displayed on the display unit 201 of the information processing apparatus 200 on the transmission side or the display unit 341 of the information processing unit 300 on the receiving side.

<2. Modified Example>

In the above description, the example in which a delay time due to wireless communication between two information processing apparatuses is acquired by using image data and sound data which have been acquired by an imaging apparatus of an information processing apparatus on the transmission side was shown. However, a delay time may be acquired by using another measurement method. Thus, an example in which a delay time is acquired by using another measurement method will be shown below.

"Example in which Delay Time is Acquired by Using Internal Clocks"

First, an example in which internal clocks of information processing apparatuses on the transmission side and the receiving side are synchronized and a delay time is acquired by using the internal clocks will be shown.

"Configuration Example of Information Processing Apparatus"

Figure 9:
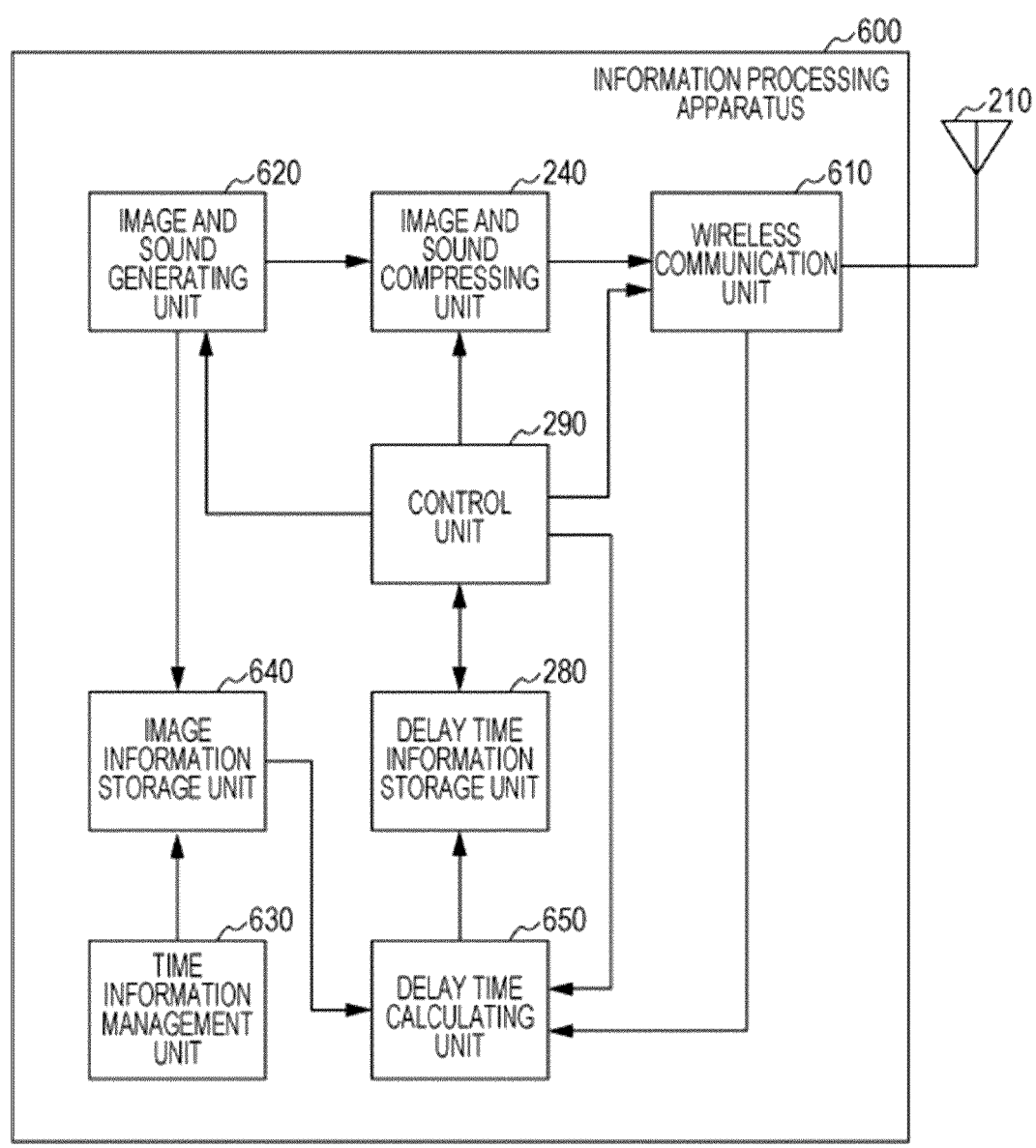
FIG. 9 is a block diagram showing a functional configuration example of an information processing apparatus according to a modified example of the embodiment of the present technology.

FIG. 9 is a block diagram showing a functional configuration example of an information processing apparatus 600 according to a modified example of the embodiment of the present technology. Since the information processing apparatus 600 is a modified example of the information processing apparatus 200 shown in FIG. 2, same reference numerals will be given to the same parts as those in the information processing apparatus 200, and a part of the description thereof will be omitted.

The information processing apparatus 600 includes a wireless communication unit 610, an image and sound generating unit 620, a time information management unit 630, an image information storage unit 640, and a delay time calculating unit 650. In addition, the wireless communication unit 610 corresponds to the wireless communication unit 220 shown in FIG. 2, the image and sound generating unit 620 corresponds to the image and sound generating unit 230 shown in FIG. 2, and the image information storage unit 640 corresponds to the image information storage unit 250 shown in FIG. 2.

Figure 10:
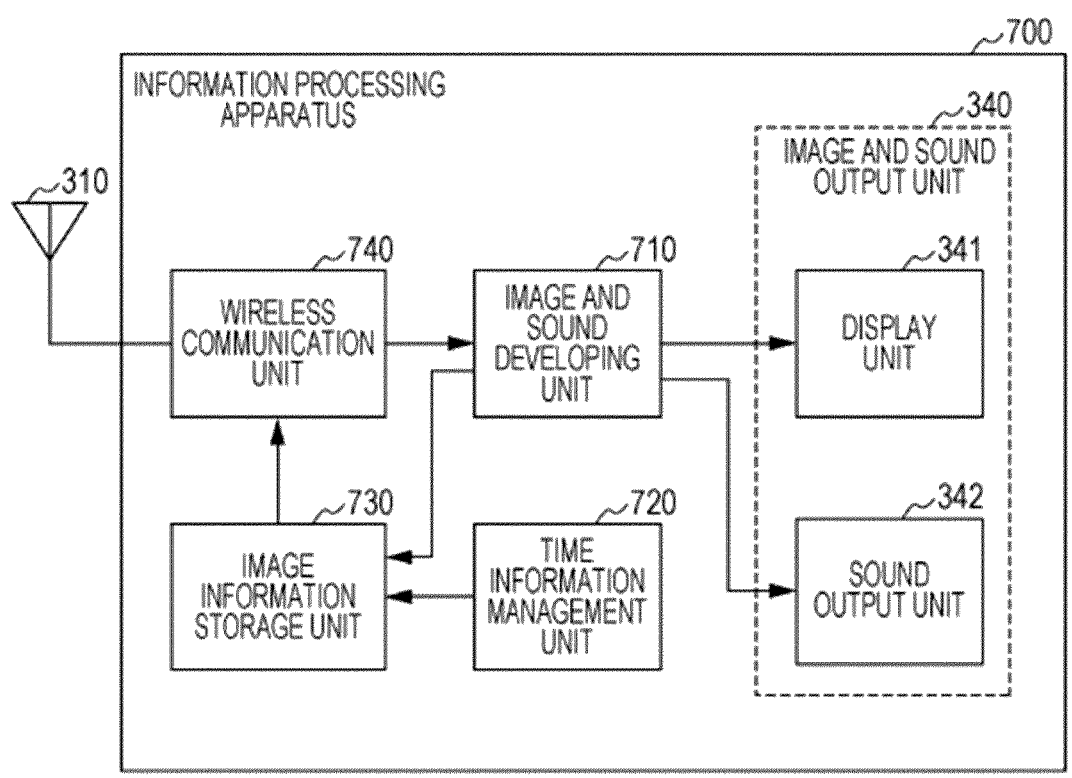
FIG. 10 is a block diagram showing a functional configuration example of an information processing apparatus according to a modified example of the embodiment of the present technology.

The wireless communication unit 610 is configured to receive image information which has been transmitted from another information processing apparatus by using wireless communication (image information which has been stored on an image information storage unit 730 shown in FIG. 10) and output the image information to the delay time calculating unit 650.

The image and sound generating unit 620 is configured to cause the image information storage unit 640 to associate and record image identification information for identifying the generated image data with time information.

The time information management unit 630 is configured to acquire and manage the time information from an external clock with high precision and supply the managed time information to the image information storage unit 640. In addition, a detailed description will be given of the time information management unit 630 as well as a time information management unit 720 shown in FIG. 10.

The image information storage unit 640 is configured to associate and record the time information which has been supplied from the time information management unit 630 with the image identification information for identifying the image data which has been generated by the image and sound generating unit 620. Then, the image information storage unit 640 supplies the stored information (image information) to the delay time calculating unit 650. A detailed description will be given of content stored on the image information storage unit 640 with reference to FIG. 11A.

The delay time calculating unit 650 is configured to calculate a delay time based on the image information which has been stored on the image information storage unit 640 and image information which has been received via the wireless communication unit 610 and cause the delay time information storage unit 280 to store the calculated delay time. In addition, a detailed description will be given of a method for calculating a delay time with reference to FIGS. 11A and 11B.

"Configuration Example of Information Processing Apparatus"

FIG. 10 is a block diagram showing a functional configuration example of an information processing apparatus 700 according to a modified example of the embodiment of the present technology. Since the information processing apparatus 700 is a modified example of the information processing apparatus 300 shown in FIG. 5, same reference numerals will be given to the same parts as those in the information processing apparatus 300, and a part of the description thereof will be omitted.

The information processing apparatus 700 includes an image and sound developing unit 710, a time information management unit 720, an image information storage unit 730, and a wireless communication unit 740. In addition, the wireless communication unit 744) corresponds to the wireless communication unit 320 shown in FIG. 5, and the image and sound developing unit 710 corresponds to the image and sound developing unit 330 shown in FIG. 5.

The time information management unit 720 is configured to acquire and manage time information from an external clock with high precision and supply the managed time information to the image information storage unit 730. Here, Global Positioning System (GPS) receivers, for example, may be used as the time information management unit 630 (shown in FIG. 9) and the time information management unit 720. By receiving GPS signals by the GPS receivers, it is possible to synchronize the internal clocks of the information processing apparatuses 600 and 700 with the external clock with high precision (an atomic clock of the GPS).

In addition, another synchronization method, by which the internal clocks of the information processing apparatuses 600 and 700 can be synchronized may be used. For example, the internal clocks of the information processing apparatuses 600 and 700 may be synchronized by using a standard wave.

Although the internal clocks of the information processing apparatuses 600 and 700 are synchronized with the external clock with high precision in this example, one internal clock may be synchronized with the other internal clock by a method with high precision. For example, a Network Time Protocol (NTP) server function is mounted on one of the information processing apparatuses 600 and 700, and an NTP client function is mounted on the other. Then, the NTP client inquires about a present time of the NTP server before the measurement of a delay time, and the NTP server replies with a time based on the internal clock of its own to the NTP client. In such a case, it is possible to synchronize the internal clocks of the information processing apparatuses 600 and 700 by the NTP client adjusting its own internal clock based on the replied time.

The image information storage unit 730 associates and stores the time information which has been supplied by the time information management unit 720 with the image identification information for identifying the image data which has been developed by the image and sound developing unit 710. Then, the information (image information) which has been stored on the image information storage unit 730 is supplied to the information processing apparatus 600 via the wireless communication unit 740. In addition, a detailed description will be given of content stored on the image information storage unit 730 with reference to FIG. 11B.

The wireless communication unit 740 is configured to periodically or non-periodically transmit the image information which has been stored on the image information storage unit 730 to another information processing apparatus (for example, the information processing apparatus 600) via the antenna 310.

"Example of Content Stored on Image Information Storage Unit"

Figure 11A:
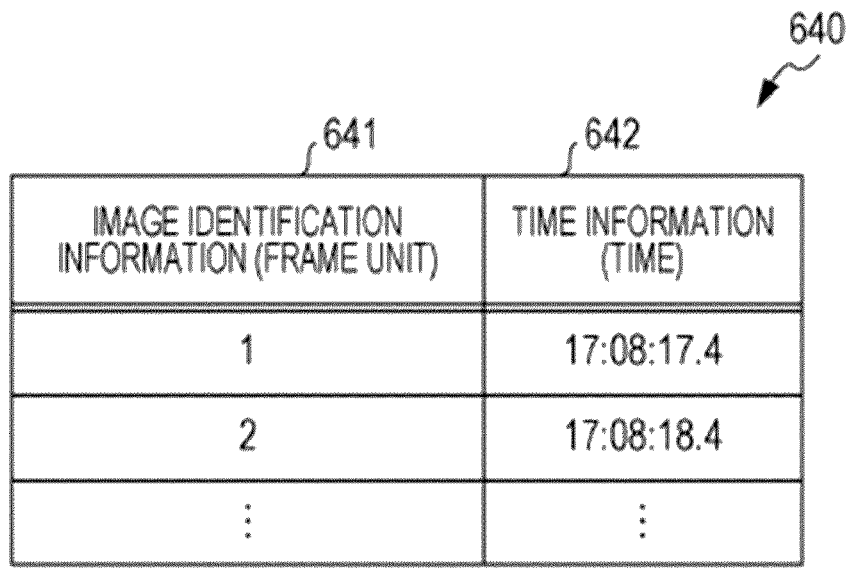
FIG. 11 is a diagram showing an example of content stored on an image information storage unit according to a modified example of the embodiment of the present technology.
Figure 11B:
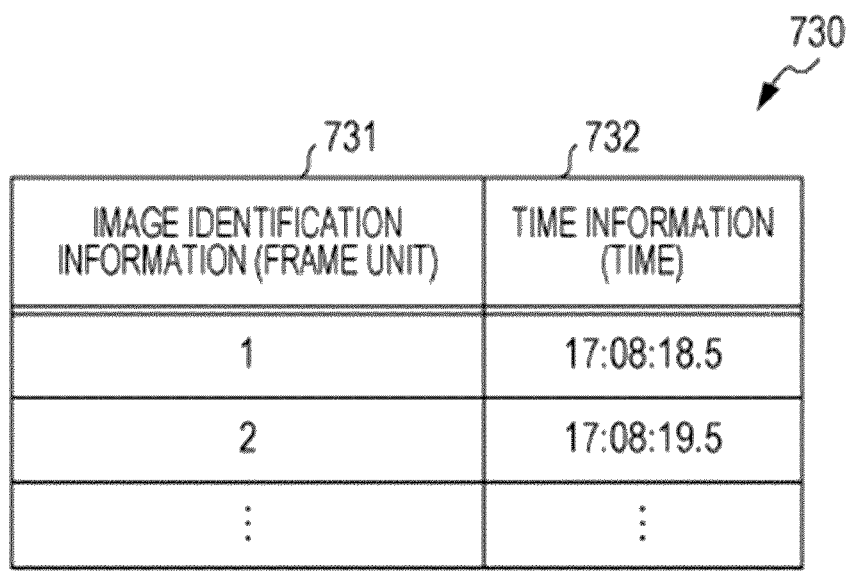

FIGS. 11A and 11B are diagrams showing an example of content stored on the image information storage units 640 and 730 according to the modified example of the embodiment of the present technology. FIG. 11A shows content stored on the image information storage unit 640, and FIG. 11B shows content stored on the image information storage unit 730.

As shown in FIG. 11A, the image information storage unit 640 associates and stores image identification information 641 with time information 642. As shown in FIG. 11B, the image information storage unit 730 associates and stores image identification information 731 with time information 732.

The image identification information 641 is image identification information (for example, an order of frames) for identifying image data (frames) which has been generated by the image and sound generating unit 620. In addition, the image identification information 731 is image identification information (for example, an order of frames) for identifying image data (frames) which has been developed by the image and sound developing unit 710.

The time information 642 is time information which has been supplied from the time information management unit 630. For example, a generation time at which the image data (frames) was generated by the image and sound generating unit 620 is sequentially recorded in the time information 642. In addition, the time information 732 is time information which has been supplied from the time information management unit 720. For example, a development time (generation time) at which the image data (frames) was developed by the image and sound developing unit 710 is sequentially recorded in the time information 732. In addition, time intervals between frames are increased and shown in FIGS. 11A and 11B for the purpose of simplifying the description.

Here, a description will be given of a method for calculating a delay time. According to this modified example, the receiver transmits a time at which the image data is displayed to the transmitter in a state where the respective internal clocks of the transmitter and the receiver are synchronized as described above. For example, the information processing apparatus 700 on the receiving side periodically or non-periodically transmits the image information which has been stored on the image information storage unit 730 to the information processing apparatus 600 on the transmission side in a state where the respective internal clocks of the information processing apparatuses 600 and 700 are synchronized.

If the image information has been received from the information processing apparatus 700 on the receiving side, the delay time calculating unit 650 of the information processing apparatus 600 on the transmission side calculates a delay time based on the received image information and the image information which has been stored on the image information storage unit 640.

As shown in FIG. 11B, for example, a display time of the first frame with respect to the information processing apparatus 700 on the receiving side is "17:08:18.5" while a display time of the second frame is "17:08:19.5". In addition, as shown in FIG. 11A, a generation time of the first frame with respect to the information processing apparatus 600 on the transmission side is "17:08:17.4" while a generation time of the second frame is "17:08:18.4". In such a case, the delay time calculating unit 650 of the information processing apparatus 600 on the transmission side calculates a difference between the display time of each frame by the information processing apparatus 700 on the receiving side and the generation time of each frame by the information processing apparatus 600 on the transmission side and regards the difference value as a delay time. In the example shown in FIGS. 11A and 11B, for example, the difference between the display time of each frame by the information processing apparatus 700 on the receiving side and the generation time of each frame by the information processing apparatus 600 on the transmission side is calculated as 1.1 seconds. If a difference between the display time and the generation time of each frame differs for each frame, an average value of the calculated differences may be used.

Although a delay time is calculated by using the image data in the modified example, a delay time can be similarly calculated by using the sound data.

"Example in which Delay Time is Acquired by Acquiring Output Images from Transmitter and Receiver by External Device"

Next, an example in which output images of the transmitter and the receiver are acquired by an external device and a delay time is acquired based on a comparison result of the output images will be shown.

"Configuration Example of Communication System"

Figure 12:
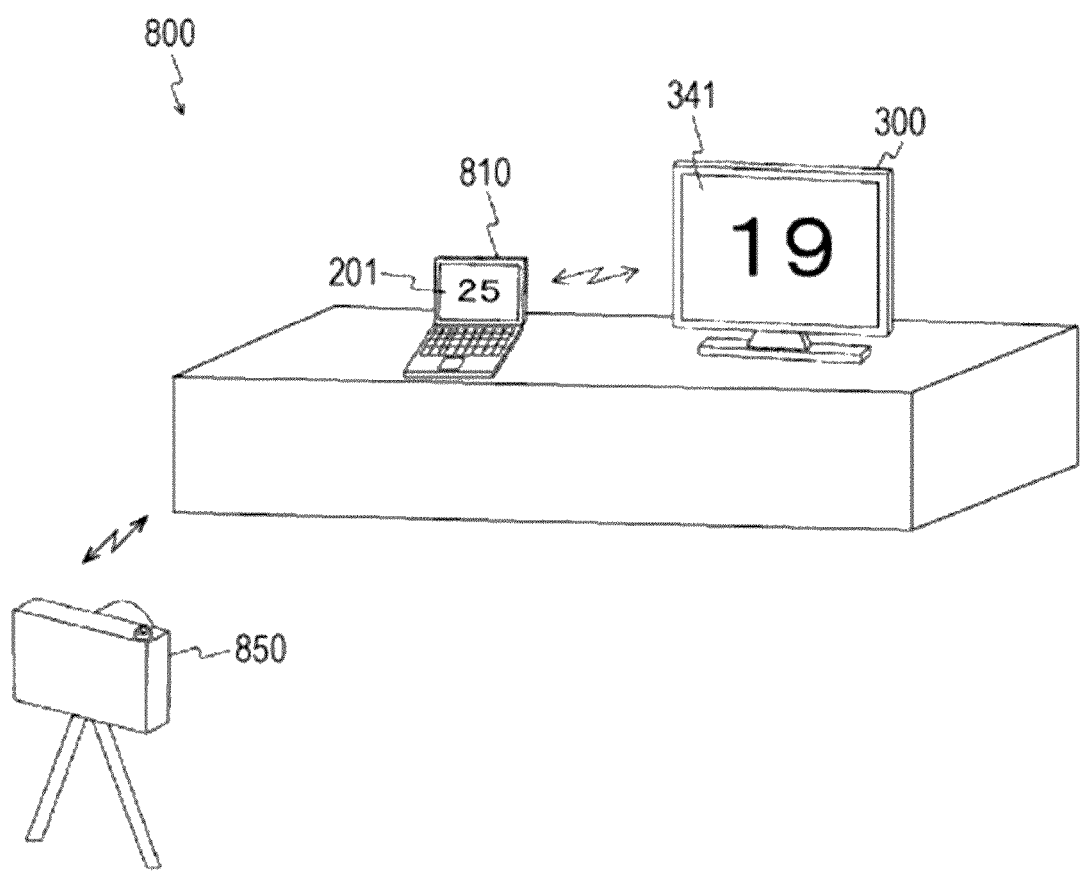
FIG. 12 is a diagram showing a configuration example of a communication system according to a modified example of the embodiment of the present technology.

FIG. 12 is a diagram showing a configuration example of a communication system 800 according to a modified example of the embodiment of the present technology. FIG. 12 shows an example of a system configuration when two information processing apparatuses (information processing apparatuses 810 and 300) are directly connected in a wireless manner. Since the communication system 800 is a modified example of the communication system 100 shown in FIG. 1, same reference numerals will be given to the same parts as those in the communication system 100, and a part of the description thereof will be omitted.

The communication system 800 includes the information processing apparatus 300, the information processing apparatus 810, and an imaging apparatus 850. The information processing apparatus 810 corresponds to the information processing apparatus 200 shown in FIG. 1.

The imaging apparatus 850 is configured to image an object, generate image data, and calculates a delay time, which occurs when data is exchanged between the information processing apparatuses 810 and 300, based on the generated image data. Then, the imaging apparatus 850 outputs the calculated delay time to the information processing apparatus 810 by using wireless communication. As the imaging apparatus 850, a high-speed camera provided with a wireless communication function can be used.

"Configuration Example of Information Processing Apparatus and Imaging Apparatus"

Figure 13:
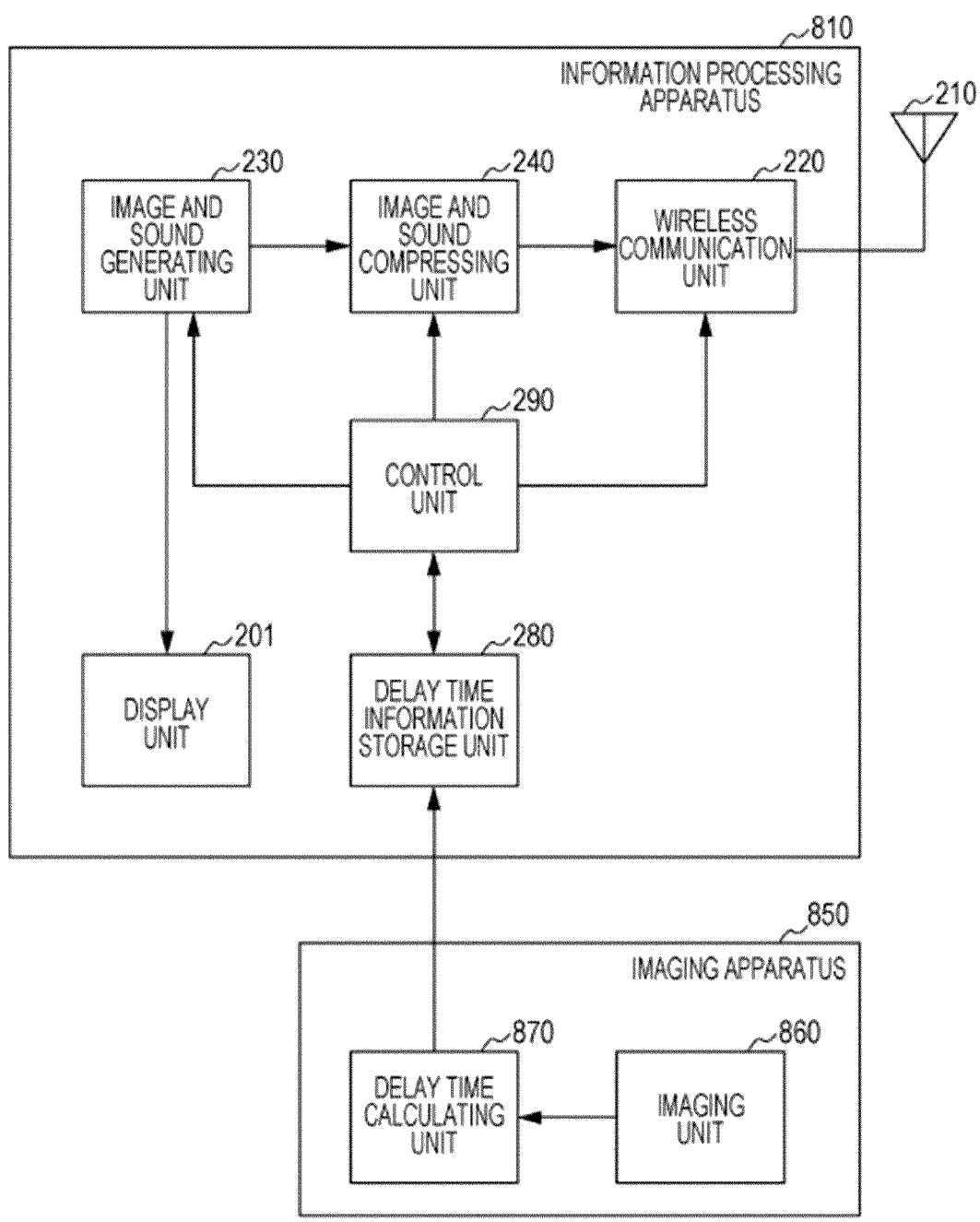
FIG. 13 is a block diagram showing an information processing apparatus and an imaging apparatus according to a modified example of the embodiment of the present technology.

FIG. 13 is a block diagram showing a functional configuration example of the information processing apparatus 810 and the imaging apparatus 850 according to the modified example of the embodiment of the present technology. Since the information processing apparatus 810 is a modified example of the information processing apparatus 200 shown in FIG. 2, same reference numerals will be given to the same parts as those in the information processing apparatus 200, and a part of the description thereof will be omitted.

The imaging apparatus 850 includes an imaging unit 860 and a delay time calculating unit 870.

The imaging unit 860 is configured to image an object, generate image data, and output the generated image data to the delay time calculating unit 870.

The delay time calculating unit 870 is configured to calculate a delay time, which occurs when data is exchanged between the information processing apparatuses 810 and 300, based on the image data which has been output from the imaging unit 860. Then, the delay time calculating unit 870 outputs the calculated delay time to the information processing apparatus 810 by using wireless communication and causes the delay time information storage unit 280 to record the calculated delay time. In FIG. 13, a functional configuration relating to the wireless communication between the information processing apparatus 810 and the imaging apparatus 850 will be omitted for the purpose of simplifying the description.

Here, a description will be given of a method for calculating a delay time. According to this modified example, the two information processing apparatuses (the information processing apparatuses 810 and 300) are aligned in the same direction so as to be close to each other as shown in FIG. 12, and output images of the information processing apparatuses are simultaneously imaged by using the imaging apparatus 850. In such a case, test images (images with incremented numbers for each frame, for example) are displayed on the two information processing apparatuses (the information processing apparatuses 810 and 300). That is, the information processing apparatus 810 on the transmission side sequentially transmits the test images to the information processing apparatus 300 in a state shown in FIG. 12, and the test images are displayed on the respective information processing apparatuses 810 and 300.

The imaging unit 860 of the imaging apparatus 850 generates image data which includes the two test images being respectively displayed on the information processing apparatus 810 on the transmission side and the information processing apparatus 300 on the receiving side and outputs the generated image data to the delay time calculating unit 870.

The delay time calculating unit 870 detects the two test images which are included in the image data output from the imaging unit 860 and calculates a delay time based on a comparison result of the detected text images. For example, it is possible to detect the test images by using a typical image analysis method. For example, the test images can be extracted by using an image detecting technology for detecting a rectangular object. Alternatively, a number which is included in each test image can be specified by using the aforementioned character recognition technology.

In the example shown in FIG. 12, "25" is displayed on the display unit 201 of the information processing apparatus 810 on the transmission side while "19" is displayed on the display unit 341 of the information processing apparatus 300 on the receiving side, for example. In such a case, the delay time calculating unit 870 can determine that a delay time between the information processing apparatus 810 on the transmission side and the information processing apparatus 300 on the receiving side corresponds to 6 frames. If the test images are transmitted at 30 fps, the delay time is calculated as 200 (msec).

Although two test images are acquired by using a single imaging apparatus 850 in this modified example, two test images may be acquired by using a plurality of imaging apparatuses. For example, it is possible to acquire two test images by simultaneously imaging the transmitter and the receiver by using two cameras with shutters which can be released at the same time. In such a case, a delay time can be calculated by any one of the cameras (or the transmitter).

Although a delay time is calculated by using image data in this modified example, a delay time may be calculated by using sound data. For example, the same sound data (for example, "pop") which is output from the information processing apparatus 300 and the information processing apparatus 810 is acquired by the imaging apparatus 850. Then, the delay time calculating unit 870 calculates a delay time based on the sound data (for example, "pop") which has been output from the information processing apparatus 300) and the sound data (for example, "pop") which has been output from the information processing apparatus 810. For example, a delay time can be calculated based on a difference between a timing at which the sound data (for example, "pop") output from the information processing apparatus 300 is acquired and a timing at which the sound data (for example, "pop") output from the information processing apparatus 810 is acquired.

Here, a communication system which transmits an image and sound output from a certain information processing apparatus in real time to another information processing apparatus via a network and causes the other information processing apparatus to output the image and sound will be considered. If it is attempted to transmit image data without compressing the image data in the communication system, a significantly wide bandwidth is necessary. For this reason, image data and sound data are compressed by any scheme before transmitting the image data and the sound data, and the information processing apparatus which has received the image data and the sound data develops and displays the compressed image data and sound data in many cases. For example, there is a rule that an image is compressed and developed by using H.264 in Wi-Fi CERTIFIED Miracast which has been designed by Wi-Fi Alliance.

As described above, delay due to time necessary for compression and development of image data and sound data occurs as well as delay due to wireless communication with the use of a network in the aforementioned communication system.

For example, a case where an application (for example, a game) in which depiction in an entire screen is determined based on an operation input by a user is applied to the aforementioned communication system is assumed. For example, a situation where the game application is operated on a tablet terminal and the game screen and sound output from the tablet terminal are transmitted to a display terminal (for example, a television) via a network is considered. In such a case, a time difference due to the aforementioned delay occurs from a timing at which the user inputs an operation to the tablet terminal to a timing at which the image and the sound reflecting the operation input are output from the display terminal. There is a concern that such delay or a time difference provides the user with a severe feeling of strangeness in a game with intensive motion or in a game in which strict timing control is necessary, in particular. In such a case, there is a concern that the user becomes less interested in the game.

Here, there are various types of schemes for compressing image data and sound data, and a calculation amount and time necessary for compression and development differ depending on the type. In addition, multiple parameters are used in a certain compression scheme (for example, H.264), and a time necessary for compression and development changes depending on the value. A case where an encoder (compressor) in a transmitter and a decoder (developer) in a receiver are designed and mounted for specific use states (for receiving television broadcasting, for example) is assumed. In such a case, there is a possibility that a time necessary for compression and development is reduced by using the same compression scheme and the same compression parameter setting as those in the specific use states. As described above, a delay time due to compression and development changes depending on a compression scheme and the setting thereof.

In addition, a delivery amount increases if it is attempted to deliver image data and sound data at a low compression rate. Therefore, there is a possibility that the image data and sound data become missing in the course of the delivery and the delay conversely increases by re-forwarding processing if a low compression rate is selected in a case where a bandwidth of a network for delivery is narrow or in a case of a crowded network.

Based on the above circumstances, it is possible to enhance user experience by shortening a delay time by appropriately adjusting a used compression scheme and parameters therefor when image data and sound data are transmitted by using a network.

Thus, according to the embodiment of the present technology, a compression scheme and parameters are changed in various manners on the side of a transmitter, changes in an entire delay amount through compression, delivery, and development are monitored, and a delay time is measured for each parameter. Then, a parameter relating to delay is adjusted based on the measured delay time, and an influence of the delay on a user is compensated for. For example, it is possible to determine a compression parameter which brings about the shortest delay time. In so doing, it is possible to search for a minimum value of a delay time relating to compression and expansion on the transmission side and compensate for the delay as a whole communication system.

That is, according to the embodiment of the present technology, it is possible to determine an appropriate compression parameter in a communication system in which image data and sound data are compressed and the compressed image data and sound data are transmitted and output from a transmitter to a receiver via a network. In so doing, it is possible to achieve an appropriate delay time for a user.

Although a delay time due to compression and expansion differs depending on a combination of a transmitter and a receiver, it is possible to find a parameter capable of minimizing the delay time regardless of any combination in the embodiment of the present technology.

In addition, it is possible to find an optimal value of a delay time as a whole in consideration of not only a time necessary for compression and development but also an influence due to a bandwidth of a network according to the embodiment of the present technology. Moreover, it is possible to complete the processing only on the side of a transmitter as described above in the first embodiment of the present technology. In such a case, it is not necessary to add a special apparatus and processing to the receiver and exchange information relating to delay or the like between the receiver and the transmitter via a network. In addition, it is not necessary to newly design and mount a network communication protocol, and a problem of compatibility does not occur. Moreover, it is not necessary for a user to perform an operation, and measurement and adjustment can be automatically completed.

In addition, it can be assumed that a user who places a higher priority on high image quality than on occurrence of delay may be present. Thus, the embodiment of the present technology can be applied to use purposes such as a case where a delay amount and a compression rate are balanced or a case where a delay amount and image and sound quality are balanced as well as a case where delay is minimized. For example, a configuration in which setting items which are considered to be important by a user (a balance between a delay time and a compression rate or a balance between a delay amount and image and sound quality) can be set based on a user operation and an encoding parameter is determined based on the setting is also applicable.

Although a delay time is measured by a transmitter or an external device in the embodiment of the present technology, the delay time may be measured by a receiver. In such a case, the delay time which has been measured by the receiver is transmitted to and used by the transmitter.

In addition, the description of the embodiment of the present technology was given as an example in which the data to be transmitted from the transmitter to the receiver was image data and sound data. However, it is possible to apply the embodiment of the present technology to a case where data other than image data and sound data is a target to be transmitted from the transmitter to the receiver.

Here, an information processing apparatus capable of using a plurality of codecs is present as described above. Therefore, a case where both the transmitter and the receiver are compatible with a plurality of codecs can be assumed, for example. Thus, if both the transmitter and the receiver are compatible with a plurality of codecs, a delay time may be measured by attempting all the plurality of codecs in order in both the transmitter and the receiver. In such a case, a type of codec to be set in each of the transmitter and the receiver is determined as setting content relating to data transmission based on the measured delay time. For example, a codec with the shortest delay time among the measured delay times is determined as a codec to be set in each of the transmitter and the receiver.

Although the description of the embodiment of the present technology was given as an example of a display apparatus and a mobile information processing apparatus which are provided with a wireless communication function, the embodiment of the present technology can be applied to another information processing apparatus which is provided with a wireless communication function. For example, it is possible to apply the embodiment of the present technology to information processing apparatuses such as a home-use game machine, a mobile video image processing apparatus, a mobile game machine, a digital still camera, a digital video camera (for example, a camera integrated recorder), and a digital photo frame. In addition, it is possible to apply the embodiment of the present technology to an information processing apparatus capable of performing wireless communication by attaching a wireless communication device which is provided with a wireless communication function (for example, a personal computer which is not provided with a wireless communication function), for example.

In addition, the aforementioned embodiment is an example for implementing the present technology, and items in the embodiment have correspondence with items disclosed in the claims for specifying the technology. Similarly, the items in the claims for specifying the technology have correspondence with items with the same names in the embodiment. However, the present technology is not limited to the embodiment and can be implemented by adding various modifications to the embodiment without departing from the gist thereof.

In addition, the processing procedure described in the aforementioned embodiment may be understood as a method which includes the series of procedures or may be understood as a program for causing a computer to execute the series of procedures or as a recording medium which records the program therein. As such a recording medium, it is possible to use a Compact Disc (CD), a MiniDisc (MD), a Digital Versatile Disc (DVD), a memory card, a Blu-ray Disc (registered trademark), or the like, for example.

In addition, the present technology can employ the following configurations.

(1) A first device for processing data, the first device comprising:
at least one control circuit configured to adjust at least one parameter related to a delay time based on a measured value of the delay time,
wherein the measured value of the delay time is a difference between a first time associated with when the first device processes the data and a second time associated with when a second device processes the data.

(2) The first device of (1), wherein the data comprises image data and/or sound data.

(3) The first device of (2), wherein the first time is associated with when the first device processes the image data and the second time is associated with when the second device processes the image data.

(4) The first device of (2), wherein the at least one parameter is an encoding parameter used to encode the image data and/or the sound data.

(5) The first device of (2), wherein the first time is an average of a when the first device processes the image data and when the first device processes the sound data, and the second time is an average of when the second device processes the image data and when the second device processes the sound data.

(6) The first device of (1), wherein the first time is a time that the data is reproduced by the first device.

(7) The first device of (1), wherein the second time is a time that the data is reproduced by the second device.

(8) The first device of (1), wherein the first time is the time that the data is transmitted by the first device to the second device.

(9) The first device of (1), wherein the second time is the time that the data is received by the second device from the first device.

(10) The first device of (1), further comprising:
at least one antenna; and
a wireless communication circuit configured to control transmitting the data to the second device wirelessly via the at least one antenna.

(11) The first device of (10), wherein the wireless communication circuit is configured to transmit the data according to the Wi-Fi Display wireless network standard.

(12) The first device of (11), wherein adjusting the at least one parameter comprises a capability negotiation procedure and/or a capability re-negotiation procedure of the Wi-Fi Display wireless network standard.

(13) The first device of (2), further comprising:
a display circuit configured to display the image data.

(14) The first device of (1), wherein adjusting the at least one parameter comprises determining an optimal parameter based on a plurality of measured values of the delay time, wherein each of the plurality of measured values of the delay time is associated with a respective value of the at least one parameter.

(15) The first device of (1), further comprising:
an image capturing device configured to acquire an image of the data displayed by the second device,
wherein the second time is based on the image acquired by the image capturing device.

(16) The first device of (1), wherein:
the first time is based on first image data acquired by an external image capturing device; and
the second time is based on second image data acquired by the external image capturing device.

(17) The first device of (1), wherein:
the first time is based on an internal clock of the first device;
the second time is based on an internal clock of the second device; and
the internal clock of the first device is synchronized with the internal clock of the second device.

(18) The first device of (1), wherein:
the first device is a transmitting device for transmitting the data to the second device; and
the second device is a receiving device for receiving the data from the first device.

(19) A method for operating a first device for processing data, the method comprising: adjusting at least one parameter related to a delay time based on a measured value of the delay time,
wherein the measured value of the delay time is a difference between a first time associated with when the first device processes the data and a second time associated with when a second device processes the data.

(20)
At least one computer readable medium encoded with instructions that, when executed by at least one processor of a first device, performs a method, the method comprising: adjusting at least one parameter related to a delay time based on a measured value of the delay time,
wherein the measured value of the delay time is a difference between a first time associated with when the first device processes the data and a second time associated with when a second device processes the data.

In addition, the present technology can employ the following configurations.

(1) An information processing apparatus including: an acquiring unit which acquires a delay time relating to data transmission to another information processing apparatus by using wireless communication; and a control unit which performs control for determining setting content relating to the data transmission to another information processing apparatus based on the acquired delay time.

(2) The apparatus according to (1), wherein the acquiring unit acquires the delay time, which has been measured for a plurality of parameters used in the data transmission to another information processing apparatus, for each of the parameters, and wherein the control unit determines as the setting content a parameter corresponding to the minimum delay time among the acquired delay times.

(3) The apparatus according to (2), wherein the control unit sequentially sets the plurality of parameters in order to measure the delay time for each of the parameters.

(4) The apparatus according to any one of (1) to (3), wherein the control unit determines as the setting content a parameter which is used for encoding data to be transmitted to another information processing apparatus.

(5) The apparatus according to any one of (1) to (4), further including: a storage unit which stores data to be transmitted to another information processing apparatus; and a data acquiring unit which acquires the data which has been output from another information processing apparatus, wherein the acquiring unit calculates the delay time based on a comparison result between the stored data and the acquired data.

(6) The apparatus according to any one of (1) to (5), wherein the acquiring unit calculates the delay time based on a comparison result between image data to be transmitted to another information processing apparatus and the image data which has been output from another information processing apparatus and a comparison result between sound data to be transmitted to another information processing apparatus and the sound data which has been output from another information processing apparatus.

(7) The apparatus according to (6), wherein the image data is test image data for measuring the delay time, and wherein the sound data is test sound data for measuring the delay time.

(8) A control method of an information processing apparatus including: acquiring a delay time relating to data transmission to another information processing apparatus by using wireless communication; and performing control for determining setting content relating to the data transmission to another information processing apparatus based on the acquired delay time.

The present disclosure contains subject matter related to that disclosed in Japanese Priority Patent Application JP 2012-272940 filed in the Japan Patent Office on Dec. 14, 2012, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

REFERENCE SIGNS LIST 100, 800 communication system
200, 300, 600, 700, 810 information processing apparatus
201, 341 display unit
210, 310 antenna
220, 320, 610, 740 wireless communication unit
230, 620 image and sound generating unit
240 image and sound compressing unit
250, 640, 730 image information storage unit
255 sound information storage unit
260 data acquiring unit
270, 650, 870 delay time calculating unit
280 delay time information storage unit
290 control unit
330, 710 image and sound developing unit
340 image and sound output unit
342 sound output unit
400, 850 imaging apparatus
630, 720 time information management unit
860 imaging unit

The invention claimed is:
1. A first device, comprising:
  circuitry configured to:
    control a first data process of data; and
    adjust at least one parameter related to a delay time based on a first value of the delay time,
  wherein:
    the data comprises image data and sound data,
    the first value of the delay time is a difference between a first time of termination of the first data process of the data at the first device and a second time of termination of a second data process of the data at a second device,
    the first time is a first average of a third time of termination of the first data process of the image data at the first device and a fourth time of termination of the first data process of the sound data at the first device, and
    the second time is a second average of a fifth time of termination of the second data process of the image data at the second device and a sixth time of termination of the second data process of the sound data at the second device.

2. The first device of claim 1, wherein the at least one parameter is an encoding parameter used to encode at least one of the image data or the sound data.

3. The first device of claim 1, wherein
  the circuitry is further configured to control reproduction of the data; and
  the first time is a time of termination of the reproduction of the data at the first device.

4. The first device of claim 1, wherein the second time is a time of termination of reproduction of the data at the second device.

5. The first device of claim 1, wherein
  the circuitry is further configured to control transmission of the data from the first device to the second device; and
  the first time is a time of termination of the transmission of the data from the first device to the second device.

6. The first device of claim 1, wherein the second time is a time of termination of reception of the data by the second device from the first device.

7. The first device of claim 1, wherein the circuitry is further configured to control transmission of the data to the second device.

8. The first device of claim 7, wherein the circuitry is further configured to transmit the data based on Wi-Fi Display wireless network standard.

9. The first device of claim 8, wherein the circuitry is further configured to adjust the at least one parameter based on at least one of a capability negotiation procedure or a capability re-negotiation procedure of the Wi-Fi Display wireless network standard.

10. The first device of claim 1,
  wherein the circuitry is further configured to display the image data.

11. The first device of claim 1,
  wherein the circuitry is further configured to determine an optimal parameter based on a plurality of second values of the delay time, and
  wherein at least one of the plurality of second values of the delay time is associated with at least one of a plurality of third values of the at least one parameter.

12. The first device of claim 1,
  wherein the circuitry is further configured to acquire an image of the data that is displayed by the second device, and
  wherein the second time is based on the acquired image.

13. The first device of claim 1, wherein
  the first time is based on first image data acquired by an external image capturing device, and
  the second time is based on second image data acquired by the external image capturing device.

14. The first device of claim 1, wherein
the first time is based on a first internal clock of the first device,
the second time is based on a second internal clock of the second device, and
the first internal clock is synchronized with the second internal clock.

15. The first device of claim 1, wherein
the circuitry is further configured to transmit the data to the second device, and
the second device receives the data from the first device.

16. A method, comprising:
in a first device:
controlling a first data process of data; and
adjusting at least one parameter related to a delay time based on a value of the delay time,
wherein
the data comprises image data and sound data,
the value of the delay time is a difference between a first time of termination of the first data process of data at the first device and a second time of termination of a second data process of the data at a second device,
the first time is a first average of a third time of termination of the first data process of the image data at the first device and a fourth time of termination of the first data process of the sound data at the first device, and
the second time is a second average of a fifth time of termination of the second data process of the image data at the second device and a sixth time of termination of the second data process of the sound data at the second device.

17. A non-transitory computer-readable medium having stored thereon, computer-executable instructions, which when executed by a processor of a first device, cause the processor to execute operations, the operations comprising:
controlling a first data process of data; and
adjusting at least one parameter related to a delay time based on a value of the delay time,
wherein:
the data comprises image data and sound data,
the value of the delay time is a difference between a first time of termination of the first data process of the data at the first device and a second time of termination of a second data process of the data at a second device,
the first time is a first average of a third time of termination of the first data process of the image data at the first device and a fourth time of termination of the first data process of the sound data at the first device, and
the second time is a second average of a fifth time of termination of the second data process of the image data at the second device and a sixth time of termination of the second data process of the sound data at the second device.

* * * * *